(12) United States Patent
Schwellenbach et al.

(10) Patent No.: US 12,226,738 B2
(45) Date of Patent: Feb. 18, 2025

(54) COMBINATION OF PYRROLIDONE BASED SOLVENTS FOR THE PRODUCTION OF POROUS MEMBRANES

(71) Applicant: Sartorius Stedim Biotech GmbH, Göttingen (DE)

(72) Inventors: Jan Schwellenbach, Göttingen (DE); Catharina Warnke, Göttingen (DE); Sandra Otto, Göttingen (DE)

(73) Assignee: Sartorius Stedim Biotech GMBH, Gottingen (DE)

( * ) Notice: Subject to any disclaimer, the term of this patent is extended or adjusted under 35 U.S.C. 154(b) by 450 days.

(21) Appl. No.: 17/607,353

(22) PCT Filed: Jun. 25, 2020

(86) PCT No.: PCT/EP2020/067862
§ 371 (c)(1),
(2) Date: Oct. 28, 2021

(87) PCT Pub. No.: WO2020/260473
PCT Pub. Date: Dec. 30, 2020

(65) Prior Publication Data
US 2022/0203306 A1 Jun. 30, 2022

(30) Foreign Application Priority Data
Jun. 27, 2019 (EP) ..................................... 19182866

(51) Int. Cl.
*B01D 67/00* (2006.01)
*B01D 71/68* (2006.01)

(52) U.S. Cl.
CPC ........ *B01D 67/00111* (2022.08); *B01D 71/68* (2013.01); *B01D 2325/021* (2013.01)

(58) Field of Classification Search
CPC ................ B01D 67/0011; B01D 71/68; B01D 2325/021; B01D 67/00111;
(Continued)

(56) References Cited

U.S. PATENT DOCUMENTS

2011/0031100 A1  2/2011  Qtaishat et al.
2015/0054197 A1  2/2015  Vecitis et al.
(Continued)

FOREIGN PATENT DOCUMENTS

JP      S55 71812 A       5/1980
KR   2012 0118408 A      10/2012

OTHER PUBLICATIONS

Mousavi, S; Investigation of the relation between viscoelastic properties of polysulfone solutions, phase inversion process and membrane morphology: The effect of solvent power, Journal of Membrane Science, vol. 532, 2017, pp. 47-57, ISSN 0376-7388, https://doi.org/10.1016/j.memsci.201 (Year: 2017).*

(Continued)

*Primary Examiner* — Bradley R Spies
*Assistant Examiner* — Jeannie McDermott
(74) *Attorney, Agent, or Firm* — Klarquist Sparkman, LLP

(57) ABSTRACT

The present invention relates to a method for producing a porous membrane, the method being characterized in that a solvent system comprising 2-pyrrolidone and N-alkyl-2-pyrrolidone is used, wherein the content ratio of 2-pyrrolidone to N-alkyl-2-pyrrolidone in the solvent system is from 90%:10% to 10%:90%, based on mass %, and wherein N-alkyl-2-pyrrolidone is N-propyl-2-pyrrolidone and/or N-butyl-2-pyrrolidone. Furthermore, the present invention relates to a porous membrane obtainable by said method. Moreover, the present invention relates to the use of a specific solvent system for the production of a porous membrane.

9 Claims, 11 Drawing Sheets

(58) Field of Classification Search
CPC ........ B01D 2323/12; B01D 2323/2185; B01D 2323/2187; B01D 2323/219; B01D 2325/0233; B01D 2325/025; B01D 2325/026; B01D 2325/0283; B01D 2325/04; B01D 69/02

See application file for complete search history.

(56) References Cited

U.S. PATENT DOCUMENTS

| | | | |
|---|---|---|---|
| 2015/0057375 A1* | 2/2015 | Vandeputte | C09D 179/08 |
| | | | 252/364 |
| 2018/0169592 A1 | 6/2018 | Le et al. | |
| 2018/0201784 A1* | 7/2018 | Schmitt | B01D 71/68 |

OTHER PUBLICATIONS

Sherwood, J, N-Butylpyrrolidinone as a dipolar aprotic solvent for organic synthesis, Green Chem., 2016, 18, 3990-3996. (Year: 2016).*

Extended European Search Report, dated Jan. 7, 2020, issued in corresponding European Application No. 19182866.4, 10 pages.

International Search Report and Written Opinion, dated Aug. 27, 2020, issued in corresponding International Application No. PCT/EP2020/067862, 17 pages.

* cited by examiner

COMBINATION OF PYRROLIDONE BASED SOLVENTS FOR THE PRODUCTION OF POROUS MEMBRANES

CROSS REFERENCE TO RELATED APPLICATIONS

This is the U.S. National Stage of International Application No. PCT/EP2020/067862, filed on Jun. 25, 2020, which was published in English under PCT Article 21(2), and which claims the benefit of the earlier filing date of European application No. EP 19182866.4, filed on Jun. 27, 2019, which is incorporated by reference in its entirety herein.

The present invention relates to a method for producing a porous membrane, to a porous membrane obtainable by said method, and to the use of a specific solvent system for the production of a porous membrane.

As it is known in the art, a porous membrane can be produced by phase separation of polymer solutions. Among the different techniques to induce the demixing of the polymer solutions for membrane casting, the non-solvent induced phase separation (NIPS) and the vapor-induced phase separation (VIPS) are commonly applied. With the application of these techniques, it is possible to obtain a porous membrane with a broad range of different characteristics. A crucial factor during the NIPS and VIPS process, which influences the characteristics of the porous membrane to be obtained, such as the bulk structure and the pore size thereof, is the composition of the casting solution. Apart from the membrane-forming polymer and hydrophilic or hydrophobic additives optionally present in the casting solution, it is the solvent system of the casting solution as such, which has a significant influence on the characteristics of the resulting porous membrane. Besides its ability to dissolve all the non-solvent components of the casting solution, the solvent system has to be such that the desired membrane characteristics are achieved. In addition, it is preferable that the solvent system is non-toxic and readily biodegradable.

In the meantime, solvents like N-methyl-2-pyrrolidone (NMP), dimethylacetamide (DMA) and dimethylformamide (DMF), which have so far been extensively used in the production of porous membranes, are heavily debated as they represent substances which are carcinogenic, mutagenic and/or reprotoxic, i.e. so-called CMR substances. The use of the aforementioned solvents is subject to strict regulations, such as the Regulation (EC) No 1907/2006, better known as REACH ("Registration, Evaluation, Authorization and Restriction of Chemicals"). Further, according to the Regulation (EC) No 1272/2008, the use of solvents classified as CMR substances shall be generally prohibited. Therefore, already at present, it is evident that the aforementioned solvents will no longer be applicable in the production of porous membranes on an industrial scale.

Moreover, even if solvents like NMP, DMA and DMF exhibit an excellent solubility for the membrane-forming polymer, these polar aprotic solvents often do not result in a porous membrane having the desired membrane characteristics. In particular, by using the aforementioned solvents in pure form, it is difficult to specifically tailor the bulk structure and the pore size of the porous membrane to be obtained. In case the bulk structure and the pore size are not as required, the performance factor of the porous membrane with respect to a certain target molecule to be cut off will not be sufficient. In detail, the performance factor reflects the membrane flux which is an indicator for the permeability of the porous membrane, and also reflects the retention which is an indicator for the rejection rate of the porous membrane with respect to the target molecule. Specifically, the performance factor is defined as the product of the membrane flux and the retention.

In this context, EP 2 804 940 B1 discloses the use of N-butyl-2-pyrrolidone as an environmentally friendly alternative to CMR solvents for the manufacture of membranes.

Further, US 2018/0251627 A1 discloses the manufacture of polymer lacquers and polyethersulfone membranes by use of solvent mixtures comprising dimethyl sulfoxide and various lactones.

Moreover, US 2018/0201784 A1 discloses the manufacture of polymer lacquers and polymer membranes by use of solvent mixtures comprising sulfoxides and amides with NH group.

Accordingly, in view of the above, there is a need for an alternative solvent system, which overcomes the above-mentioned drawbacks associated with the use of conventional solvents like NMP, DMA and DMF.

The technical problem underlying the present invention is thus to provide a method for producing a porous membrane, wherein the production method to be provided shall allow for obtaining a porous membrane having improved membrane characteristics, in particular an increased performance factor, and wherein the production method to be provided shall not require the use of any CMR substances like NMP, DMA and DMF.

The solution to the above technical problem is achieved by providing the embodiments characterized in the claims.

In particular, in a first aspect of the present invention, there is provided a method for producing a porous membrane, the method comprising the following steps (a) to (d):

(a) providing a casting solution, wherein the casting solution comprises a membrane-forming polymer dissolved in a solvent system comprising 2-pyrrolidone and N-alkyl-2-pyrrolidone;

(b) forming a polymer film from the casting solution provided in step (a);

(c) contacting the polymer film formed in step (b) with a liquid precipitation bath, with a gaseous phase comprising a precipitation-inducing agent or with a combination thereof to induce membrane formation, thereby obtaining a porous membrane; and (d) drying the porous membrane obtained in step (c), wherein the content ratio of 2-pyrrolidone to N-alkyl-2-pyrrolidone in the solvent system is in the range of from 90%:10% to 10%:90%, based on mass %, and N-alkyl-2-pyrrolidone is N-propyl-2-pyrrolidone and/or N-butyl-2-pyrrolidone.

Due to the use of a solvent system comprising 2-pyrrolidone and N-alkyl-2-pyrrolidone both in a specific content ratio and in a specific composition, it is possible to obtain a porous membrane having improved membrane characteristics, in particular having a surprisingly high performance factor. Unexpectedly, the performance factors achievable with the porous membrane obtained by the present invention can even exceed those achievable by using conventional solvents like NMP, DMA and DMF. As found by the present inventors, it is the specific bulk structure of the porous membrane obtained in combination with the specific pore size, which accounts for the excellent filtration properties of the porous membrane according to the present invention, having its origin in the above-mentioned specific solvent system used for the production thereof.

As it is known to the skilled person, a porous membrane is distinguished from a non-porous membrane in that the separation is based on particle size. In other words, in a porous membrane, the separation is accomplished by a size-exclusion mechanism. In order to achieve a high rejection rate, the porous membrane needs to have pores which are smaller than the target molecule. Generally, the pore size in a porous membrane ranges from 0.1 µm to 10 µm for microfiltration applications and from 0.001 µm to 0.1 µm for ultrafiltration applications. The pore size in a porous membrane can be uniform, thus corresponding to a symmetric porous membrane, or can be non-uniform, thus corresponding to an asymmetric porous membrane. For example, without limitation, the pore size of an asymmetric porous membrane may gradually change along the thickness direction thereof.

In step (a) of the method for producing a porous membrane as defined above, a casting solution is provided, wherein the casting solution comprises a membrane-forming polymer dissolved in a solvent system comprising 2-pyrrolidone and N-alkyl-2-pyrrolidone, wherein the content ratio of 2-pyrrolidone to N-alkyl-2-pyrrolidone in the solvent system is in the range of from 90%:10% to 10%:90%, based on mass %, and N-alkyl-2-pyrrolidone is N-propyl-2-pyrrolidone and/or N-butyl-2-pyrrolidone.

Herein, the casting solution means the polymer solution from which the porous membrane is fabricated by phase separation. As such, the casting solution comprises the membrane-forming polymer which is the source material for the porous membrane to be obtained. According to the present invention, the membrane-forming polymer is not particularly limited. Basically, any membrane-forming polymer can be used which is known in the art for producing a porous membrane. In an embodiment of the present invention, the membrane-forming polymer is selected from the group consisting of polyethersulfone (PESu), polysulfone (PSu), polyphenylsulfone (PPSu), polyarylenesulfone (PASu), polybisphenylsulfone (PBSu), cellulose acetate (CA), polyamide (PA) and polyvinylidene fluoride (PVdF), each of which is a commonly applied membrane-forming polymer. In a preferred embodiment, the membrane-forming polymer is one of polyethersulfone or cellulose acetate.

For example, in the method for producing a porous membrane according to the present invention, the membrane-forming polymer is polyethersulfone. PESu is a hydrophobic polymer and can be cast from pure polymer solutions, i.e. without the need of additives present in the casting solution. Porous membranes made of PESu can be applied in both microfiltration and ultrafiltration.

As required, the casting solution may contain one or more additives. For example, additives may be contained in the casting solution, which facilitate the dissolution of the membrane-forming polymer, and/or which stabilize the dissolved membrane-forming polymer in the casting solution. Typically, the additives used herein are hydrophilic. Exemplary hydrophilic additives are polyvinylpyrrolidone, polyvinylpyrrolidone-co-poly-vinylacetate and polyethylene glycol, without, however, being limited thereto. Apart from such hydrophilic additives, the casting solution may contain other additives as long as they do not have any detrimental effect on the characteristics of the porous membrane to be obtained.

According to the present invention, the membrane-forming polymer and any optional additives are dissolved in a solvent system comprising 2-pyrrolidone and N-alkyl-2-pyrrolidone. That is, the casting solution provided in step (a) comprises the membrane-forming polymer, any optional additives and the above solvent system.

The method for producing a porous membrane according to the present invention is characterized in that the content ratio of 2-pyrrolidone to N-alkyl-2-pyrrolidone in the solvent system is in the range of from 90%:10% to 10%:90%, based on mass %. Preferably, the content ratio of 2-pyrrolidone to N-alkyl-2-pyrrolidone in the solvent system is in the range of from 80%:20% to 30%:70%, and more preferably from 75%:25% to 40%:60%, based on mass %. In other words, the solvent system comprises 10 to 90 mass % of 2-pyrrolidone and 90 to 10 mass % of N-alkyl-2-pyrrolidone, preferably 30 to 80 mass % of 2-pyrrolidone and 70 to 20 mass % of N-alkyl-2-pyrrolidone, and more preferably 40 to 75 mass % of 2-pyrrolidone and 60 to 25 mass % of N-alkyl-2-pyrrolidone, with the total mass of 2-pyrrolidone and N-alkyl-2-pyrrolidone being 100 mass %. When the solvent system comprises 2-pyrrolidone and N-alkyl-2-pyrrolidone in the above content ratio, it is ensured that the finally obtained porous membrane has excellent filtration properties, as expressed by the performance factor. The reason therefor lies in the specific bulk structure of the porous membrane obtained in combination with the specific pore size, resulting from the use of the above solvent system with its specific content ratio, which is not obtained when using 2-pyrrolidone or N-alkyl-2-pyrrolidone in pure form. Further, by using the above solvent system with its specific content ratio, it is possible to achieve increased performance factors exceeding even those achievable by using conventional solvents like NMP, DMA and DMF, without having the detrimental properties thereof in terms of carcinogenicity, mutagenicity and/or reprotoxicity though.

Generally, the solvent system used herein may also comprise small molecule components, i.e. components having a low molecular weight, other than 2-pyrrolidone and N-alkyl-2-pyrrolidone, as long as the characteristics of the porous membrane to be obtained are not adversely affected. For example, it is acceptable that the solvent system comprises a small amount of water, such as not more than 5 mass %, preferably not more than 2 mass %, and more preferably not more than 1 mass %, e.g. not more than 0.25 mass %, with the total mass of the solvent system, i.e. 2-pyrrolidone, N-alkyl-2-pyrrolidone and water, being 100 mass %. As will be explained below in more detail, water present in the solvent system in addition to 2-pyrrolidone and N-alkyl-2-pyrrolidone has an influence on the characteristics of the porous membrane to be obtained, such as the permeability thereof.

Herein, it is preferable that the solvent system used in the above-defined method for producing a porous membrane substantially comprises 2-pyrrolidone and N-alkyl-2-pyrrolidone. In other words, the combined content of solvents other than 2-pyrrolidone and N-alkyl-2-pyrrolidone in the solvent system, including water, amounts to not more than 5 mass %, preferably not more than 2 mass %, and more preferably not more than 1 mass %, e.g. not more than 0.25 mass %, with the total mass of the solvent system being 100 mass %.

In another embodiment of the present invention, the solvent system does not comprise dimethyl sulfoxide (DMSO). Dimethyl sulfoxide is a widely used polar aprotic solvent, also commonly applied in the field of membranes. Even if DMSO may be seen as a non-toxic solvent, the presence thereof is not favorable, since it cannot be entirely removed from the porous membrane after the drying step. In particular, when residual DMSO is present in the membrane, it can give rise to the formation of undesirable leachable or extractable components in the filtrate, since DMSO may be leached or extracted into the filtrate by the components in the liquid to be filtered. Other drawbacks linked to the use of DMSO are its limited biodegradability and its strong odor emission.

In a preferred embodiment of the present invention, the solvent system consists of 2-pyrrolidone and N-alkyl-2-pyrrolidone. That is, in this preferred embodiment, apart from 2-pyrrolidone and N-alkyl-2-pyrrolidone, no other solvents are present in the casting solution provided in step (a) of the above-defined method for producing a porous membrane. When solvents other than 2-pyrrolidone and N-alkyl-2-pyrrolidone are not present in the casting solution, it is easier to control the characteristics of the porous membrane to be obtained. In addition, it is easier to recover the solvent system after completion of the production method. Herein, when it is stated that the solvent system consists of 2-pyrrolidone and N-alkyl-2-pyrrolidone, which means that solvents other than 2-pyrrolidone and N-alkyl-2-pyrrolidone are not present in the casting solution, it is understood that the content of other components is at an impurity level. In fact, since 2-pyrrolidone and N-alkyl-2-pyrrolidone are hydrophilic solvents, the presence of a residual amount of water in the casting solution cannot be avoided without undue effort, but should be kept as low and as constant as possible, preferably at or below 0.03 mass %, since water as part of the solvent system does not function as a solvent per se, but rather functions as a precipitation-inducing agent.

Both 2-pyrrolidone and N-alkyl-2-pyrrolidone are lactames, i.e. cyclic amides. According to the present invention, the aliphatic ring structure of these cyclic amides may be unsubstituted or substituted. For example, the hydrogen atoms of the ring scaffold may be substituted with one or more lower alkyl groups, such as methyl or ethyl, hydroxy groups and/or amino groups. Herein, it is preferable that the aliphatic ring structure is unsubstituted, i.e. both 2-pyrrolidone and N-alkyl-2-pyrrolidone preferably have an unsubstituted ring scaffold.

The method for producing a porous membrane according to the present invention is further characterized in that N-alkyl-2-pyrrolidone is N-propyl-2-pyrrolidone and/or N-butyl-2-pyrrolidone. Accordingly, N-alkyl-2-pyrrolidone is selected from the group consisting of N-n-propyl-2-pyrrolidone, N-isopropyl-2-pyrrolidone, N-n-butyl-2-pyrrolidone, N-isobutyl-2-pyrrolidone, N-sec-butyl-2-pyrrolidone and N-tert-butyl-2-pyrrolidone, or is a combination thereof. As mentioned above, N-alkyl-2-pyrrolidone is either unsubstituted or substituted, preferably unsubstituted. Herein, it is preferable that not only the aliphatic ring structure is unsubstituted but also the propyl group and/or butyl group at the nitrogen atom of N-alkyl-2-pyrrolidone are/is unsubstituted.

Preferably, in the solvent system used according to the present invention, N-alkyl-2-pyrrolidone is N-butyl-2-pyrrolidone. More preferably, in the solvent system used according to the present invention, N-alkyl-2-pyrrolidone is N-n-butyl-2-pyrrolidone. In case the solvent system comprises 2-pyrrolidone and N-n-butyl-2-pyrrolidone, the solvent system used according to the present invention is non-toxic and readily biodegradable.

As far as the content of the respective components in the casting solution is concerned, the present invention is not particularly limited. Typically, the content of the membrane-forming polymer in the casting solution ranges from 4 to 35 mass %, preferably from 8 to 30 mass %, and more preferably from 10 to 25 mass %, while the content of the solvent system in the casting solution ranges from 96 to 65 mass %, preferably from 92 to 70 mass %, and more preferably from 90 to 75 mass %, with the total mass of the membrane-forming polymer and the solvent system being 100 mass %. In case the casting solution comprises any optional additives, the content thereof in the casting solution, i.e. the content of all optional additives taken together, is typically in the range of from 4 to 20 mass %, preferably from 6 to 16 mass %, and more preferably from 8 to 12 mass %, with the total mass of the membrane-forming polymer, the solvent system and the optional additives being 100 mass %.

The casting solution may be provided in step (a) of the above-defined method for producing a porous membrane by any suitable means known in the art. For example, the casting solution can be provided using a stirred vessel with a temperature control unit, wherein the membrane-forming polymer is added to the solvent system already having any optional additives included therein. The resulting suspension is then stirred under controlled temperature to ensure complete dissolution of the membrane-forming polymer in the solvent system, thereby yielding a homogenous casting solution. As required, a degassing procedure may be carried out in order to remove air bubbles which might otherwise impair the subsequent formation of the polymer film from the casting solution.

In step (b) of the method for producing a porous membrane as defined above, a polymer film is formed from the casting solution provided in step (a).

For this purpose, the casting solution may be placed on a substrate, such as a glass plate, and a homogenous film can be formed using a casting rake. The casting solution is casted such that the thickness of the homogenous film obtained by using the casting rake already reflects the desired thickness of the porous membrane to be obtained, which is within the range of from 50 µm to 250 µm, as described below. Preferably, the film formation is carried out in step (b) at room temperature, i.e. at a temperature of 25° C. Herein, the film formation is, however, neither limited to any specific means for forming the film nor to any specific conditions under which the film is formed.

In step (c) of the method for producing a porous membrane as defined above, the polymer film formed in step (b) is contacted with a liquid precipitation bath, with a gaseous phase comprising a precipitation-inducing agent or with a combination thereof to induce membrane formation, thereby obtaining a porous membrane.

Herein, in case step (c) is performed with a gaseous phase comprising a precipitation-inducing agent, it is preferable that the gaseous phase comprises water vapor, e.g. at a relative humidity in the range of 1 to 100%, gaseous mixtures of water and lower alkyl alcohols, such as methanol, ethanol, n-propanol, iso-propanol and n-butanol, or these lower alkyl alcohols in their pure form. Accordingly, the precipitation-inducing agent which is a non-solvent for the membrane-forming polymer may be selected from the group consisting of water, lower alkyl alcohols, such as methanol, ethanol, n-propanol, iso-propanol and n-butanol, or combinations thereof.

In a preferred embodiment, step (c) is performed with a liquid precipitation bath. For this purpose, the polymer film may be transferred to a gently agitated liquid precipitation bath to induce membrane formation by the exchange of substances between the casting solution and the precipitation-inducing agent of the liquid precipitation bath. Preferably, the time during which the polymer film is exposed to ambient atmosphere before being contacted with the liquid precipitation bath is reduced to a minimum. As the liquid precipitation bath, an aqueous solution, including water in pure form, may be used. For example, as a first liquid precipitation bath, pure water is used, and the membrane is allowed to form therein before being transferred to a second liquid precipitation bath of water containing glycerin, which allows for an impregnation of the porous membrane formed in the first liquid precipitation bath.

However, the present invention is not limited to one or more particular liquid precipitation baths. In the same way, the above impregnation treatment is optional only.

In step (d) of the method for producing a porous membrane as defined above, the porous membrane obtained in step (c) is dried.

According to the present invention, drying is not limited to any specific drying time or drying temperature. If necessary, in order to speed up the drying process, the porous membrane obtained in step (c) may be dried under reduced pressure in step (d).

The porous membrane obtained by the method for producing a porous membrane according to the present invention can be readily used for filtration, e.g. in microfiltration or ultrafiltration applications, depending on its pore size.

In another aspect of the present invention, there is provided a porous membrane, obtainable by the method for producing a porous membrane according to the present invention, as defined above, the porous membrane having a pore size in the range of from 1 nm to 5 µm and a thickness in the range of from 50 µm to 250 µm, and exhibiting a hybrid bulk structure of two distinct layers arranged on top of one another when viewed in the thickness direction thereof, wherein one of the two distinct layers has a sponge-like morphology without macrovoids.

In line with the definitions provided in EP 1 410 838 B1 and EP 1 842 581 B1, macrovoids are large elongated hollow cavernous structures formed by solvent and non-solvent accumulations during the membrane formation process. A macrovoid in the bulk structure of the membrane is sufficiently large so as not to contribute to the size-exclusion based retention of the target molecule. That is, a target molecule which enters a macrovoid cannot be trapped due to the large size difference between the target molecule and the macrovoid, which means that the target molecule passes the macrovoid and eventually reaches the filtrate. Consequently, macrovoids in the membrane do not significantly add to the resistance of the membrane to fluid flow as compared to the sponge-like morphology, but lead to higher flow rates. Along with a sponge-like morphology having a certain thickness, there is still provided sufficient mechanical support for the retentive layer.

Typically, macrovoids have no spherical pore-size geometry, but deviate from it by way of an elliptical, cylindrical or finger-like geometry. Specifically, a macrovoid may be seen as a large and elongated cavernous structure which is characterized by a diameter $d_1$ relative to the membrane width, the diameter $d_1$ being equal to or greater than 3 µm, and characterized by a diameter $d_2$ relative to the membrane depth (membrane thickness), the diameter $d_2$ being equal to or greater than 8 µm. Typically, the diameter $d_2$ is greater than the diameter $d_1$.

Any fraction of the membrane bulk structure exhibiting macrovoids belongs to the macrovoid layer, as discussed below in more detail. Herein, the sponge-like morphology of the porous membrane is characterized by the absence of macrovoids, and in line with this, referred to as sponge-like morphology without macrovoids.

According to the present invention, by using the solvent system comprising 2-pyrrolidone and N-alkyl-2-pyrrolidone, wherein the content ratio of 2-pyrrolidone to N-alkyl-2-pyrrolidone in the solvent system is in the range of from 90%:10% to 10%:90%, based on mass %, and wherein N-alkyl-2-pyrrolidone is N-propyl-2-pyrrolidone and/or N-butyl-2-pyrrolidone, a porous membrane is obtained, which has the above-mentioned structural properties. Due to these unique structural properties, the porous membrane according to the present invention has improved membrane characteristics, in particular an increased performance factor. The reason therefor lies in the specific bulk structure of the porous membrane obtained by the above-defined method, wherein said bulk structure is composed of two distinct layers arranged on top of one another when viewed in the thickness direction of the porous membrane. As such, it represents a hybrid bulk structure. In particular, a surprisingly high performance factor is achieved, since one of the two distinct layers has a sponge-like morphology without macrovoids. Herein, the other one of the two distinct layers has a macrovoid dominated morphology. The pores of the distinct layer having a sponge-like morphology without macrovoids are smaller than the macrovoids of the distinct layer having a macrovoid dominated morphology. Apart from the pore size, it is the above specific bulk structure of the porous membrane, which has a significant influence on the filtration properties, in particular on the permeability of the porous membrane.

As mentioned above, the porous membrane according to the present invention has a pore size in the range of from 1 nm to 5 µm and a thickness in the range of from 50 µm to 250 µm. Thereby, it is ensured that the porous membrane according to the present invention can be suitably used in microfiltration or ultrafiltration applications.

Preferably, the thickness of the porous membrane according to the present invention ranges from 80 µm to 200 µm, and more preferably from 100 µm to 150 µm. The membrane thickness can be appropriately controlled during the formation of the polymer film using a casting rake in step (b) of the above-defined method for producing a porous membrane. After completion of the production method, the thickness of the porous membrane can be evaluated by means of scanning electron microscopy (SEM).

The pore size of the porous membrane according to the present invention preferably ranges from 1.2 nm to 3 µm, and more preferably from 1.3 nm to 2.5 µm. The pore size of the porous membrane can be adjusted by appropriately controlling the membrane-forming conditions during phase separation induced by contacting the polymer film formed in step (b) with the liquid precipitation bath, with the gaseous phase comprising the precipitation-inducing agent or with the combination thereof in step (c) of the above-defined method for producing a porous membrane. These conditions, among those the temperature as well as the composition of the liquid precipitation bath and/or the precipitation-inducing agent in the gaseous phase, are known to and routinely set by the skilled person. In the same way, the skilled person is aware that the pore size of the porous membrane to be obtained is influenced by any optional additives which may be present in the casting solution. The factors which influence the pore size of the porous membrane are further described in "Basic Principles of Membrane Technology", Marcel Mulder, Springer Netherlands, 1996 (DOI: 10.10071978-94-009-1766-8), and in "Membrane Technology and Applications", $2^{nd}$ edition, Richard W. Baker, John Wiley & Sons, Ltd., 2004 (DOI: 10.1002/0470020393), for instance.

Herein, the pore size of the porous membrane is to be understood as the average pore size and is determined by means of porometry. Specifically, the pore size is determined as follows:

Depending on the pore size, different methods are used to determine the pore size distribution. In the field of microfiltration membranes, capillary-flow porometry is used. The capillary-flow porometry is a gas/liquid porometry, where differential gas pressure and flow rates through a membrane sample are measured first in a wet and then in a dry state. Prior to measurement, the membrane sample is contacted with the wetting fluid in such a way that a complete saturation of the membrane pores with the fluid is achieved. After this pore filling procedure, the membrane sample is transferred to the measuring cell. The gas pressure is increased stepwise after the measurement has been started. Depending on the gas pressure, the corresponding pore sizes are emptied of the filling fluid. The pressure is then increased until the smallest pore has been emptied. Afterwards, the pressure is decreased and the measurement is repeated on the dewetted membrane sample. Based on the difference between both pressure-flowrate curves, the pore size distribution can be calculated using the Young-Laplace-Equation, as further described in "Characterization of porous membranes via porometry", Aabhash Shrestha, Mechanical Engineering Graduate Theses & Dissertations, Paper 38, 2012.

The characterization of the pore size distribution of ultrafiltration (and nanofiltration) membranes cannot be performed using gas/liquid porometry, since the pore sizes are getting too small. The pressure necessary to remove the wetting liquid from the pores under the given gas/liquid interfacial tension can increase up to 50-70 bar. These pressure values cause severe damage to the membrane, and the values measured do not reflect the original pore size distribution. Accordingly, in the field of ultrafiltration (and nanofiltration) membranes, to enable the pore size determination, the interfacial tension between the wetting liquid and the displacement medium is significantly reduced by using another liquid as a displacer, which is not miscible in the wetting liquid. This method is called liquid-liquid displacement porometry. The displacement of one liquid by another can also be described using the Young-Laplace-Equation. The only difference is that not the gas flow but the liquid flow rate with respect to the differential pressure increase is recorded, as further described in "Characterization of Ultra and Nanofiltration Commercial Filters by Liquid-Liquid Displacement Porosimetry", René P. Dávila, Doctoral Thesis, 2013.

In the following, the bulk structure of the porous membrane, as obtained by the method for producing a porous membrane according to the present invention, will be explained in detail.

As mentioned above, the bulk structure of the porous membrane according to the present invention is a hybrid bulk structure. In particular, the bulk structure of the porous membrane has two different morphologies, each of them constituting a distinct layer arranged on top of one another when viewed in the thickness direction of the porous membrane. Specifically, the hybrid bulk structure is characterized in that one of the two distinct layers has a sponge-like morphology without macrovoids.

Herewith, reference is made to FIG. 1 which shows a SEM image of a membrane cross-section of a porous PESu ultrafiltration membrane obtained by the above-defined method for producing a porous membrane, wherein the hybrid bulk structure of the porous membrane is illustrated. As can be taken from FIG. 1, the top layer of the porous membrane has a sponge-like morphology without macrovoids. It is derived from the top side of the polymer film which is first in contact with the liquid precipitation bath and/or the precipitation-inducing agent in the gaseous phase during the formation of the membrane. Due to its structure, it is also referred to as sponge-like layer. As can be further taken from FIG. 1, the bottom layer makes up the greatest part of the porous membrane and has a macrovoid dominated morphology. Due to its structure, it is also referred to as macrovoid layer. While the pores in the sponge-like layer may be seen as substantially spherical, the macrovoids in the macrovoid layer are rather large and elongated in one direction, e.g. elliptically, cylindrically or finger-like shaped, having two different diameters $d_1$ and $d_2$, as mentioned above. The pores of the sponge-like layer are smaller than the macrovoids of the macrovoid layer.

The presence of the above two distinct layers results from the phase separation of the polymer solution, as it occurs in step (c) of the method for producing a porous membrane according to the present invention, and is influenced by the specific solvent system used for the casting solution provided in step (a).

The sponge-like layer dominates the filtration properties of the porous membrane, i.e. the flow resistance, and also dominates the physical stress resistance of the porous membrane, i.e. the mechanical stability. By definition, within the sponge-like layer, no macrovoid structures are observable. Herein, the sponge-like layer shows a pore size gradient. The pore size gradient can be described by an asymmetry factor which is defined as the ratio of the largest pore diameter and the smallest pore diameter of the sponge-like layer. The smallest and largest pore diameters are not restricted to a certain membrane area, i.e. they can be present anywhere in the sponge-like layer. Suitably, the determination of the pore size distribution of the sponge-like layer can be performed using SEM image analysis. A SEM image of the membrane cross-section which is perpendicular to the membrane main surfaces is acquired with a sufficient resolution. Next, the SEM image obtained is binarized to differentiate between the membrane body and the pore volume. In a preferred image analysis technique, a method is applied which is further described in "A Threshold Selection Method from Gray-Level Histograms", Nobuyuki Otsu, IEEE Trans. Sys., Man., Cyber., 9 (1), 62-66, 1979 (DOI: 10.1109TTSMC.1979.4310076). The binarized SEM image is then evaluated with respect to the distances between the membrane body and the pore volume over the entire thickness of the sponge-like layer. This results in an integral pore size distribution, which allows the calculation of the asymmetry factor by identifying the minimum and maximum pore sizes. Typically, the sponge-like layer has an asymmetry factor of at least 1.2. In a preferred embodiment, the asymmetry factor of the sponge-like layer is at least 1.5, and more preferably at least 1.8. The upper limit of the asymmetry factor of the sponge-like layer is not particularly limited. Typically, it has a value of not more than 10. In other words, the sponge-like layer of the porous membrane according to the present invention may have an asymmetry factor in the range of from 1.2 to 10, which is advantageous in terms of permeability. For example, without limitation, the asymmetry factor can be adjusted by influencing the exchange kinetics between the liquid precipitation bath and the polymer film, which in turn has a significant effect on the membrane formation kinetics with respect to the position within the membrane.

As far as the macrovoid layer is concerned, it may be characterized by an interchanging area of macrovoids and sponge-like structures. Accordingly, besides the macrovoids, the distinct layer having a macrovoid dominated morphology may also have sponge-like structures. Regarding these sponge-like structures in the macrovoid layer, with respect to the size of the pores and its asymmetry factor, the considerations provided herein for the sponge-like layer also apply to any sponge-like structures which may be present in the macrovoid layer.

As mentioned above, macrovoids are rather large and elongated structures having a diameter $d_1 \geq 3$ μm relative to the membrane width and a diameter $d_2 \geq 8$ μm relative to the membrane depth (membrane thickness), which are formed by solvent and non-solvent accumulations during the membrane formation process. Due to their significantly increased size, the contribution of the macrovoid layer to the flow resistance of the porous membrane is significantly smaller than the contribution of the sponge-like layer to the flow resistance of the porous membrane. In the same way, the macrovoid layer does not significantly contribute to the mechanical stability of the porous membrane, either.

Herein, the macrovoid layer comprises at least 1% macrovoids, preferably at least 20% macrovoids, and more preferably at least 40% macrovoids with respect to the total volume of the macrovoid layer, while typically comprising at most 99% macrovoids, preferably at most 90% macrovoids, and more preferably at most 75% macrovoids with respect to the total volume of the macrovoid layer. The determination of the dimensions and volume fractions of the macrovoids can be performed by evaluating SEM cross-section images using manual analysis or algorithm based methods, as described above in connection with the sponge-like layer.

In view of the above, it is evident that it is the sponge-like layer in the first place, which makes the pore size of the porous membrane to fall within the range of from 1 nm to 5 μm according to the present invention. Thus, and in line with the foregoing, the pore size of the sponge-like layer ranges from 1 nm to 5 μm, preferably from 1.2 nm to 3 μm, and more preferably from 1.3 nm to 2.5 μm. It is the pore size of the porous membrane, and thus, the pore size of the sponge-like layer in the first place, which influences the rejection rate of the porous membrane towards a certain target molecule to be cut off.

Generally, as far as the sponge-like layer is concerned, it can adopt two different sub-morphologies, i.e. a lacy sub-morphology which is characterized by an interpenetrating network of solid material and voidage on the one hand, and a cellular sub-morphology which is characterized by layering of (partially) closed pores on the other hand. The above two different sub-morphologies of the sponge-like layer are shown in FIG. 2A and FIG. 2B, respectively, where FIG. 2A illustrates the lacy sub-morphology and FIG. 2B illustrates the cellular sub-morphology. When comparing these two different sub-morphologies with the proviso that the pore size is the same, the lacy sub-morphology leads to a higher permeability compared to the cellular sub-morphology, while the rejection rate remains the same. The reason therefor lies in the increased number of permeable pores in the lacy sub-morphology which may be seen as an open porous structure, in contrast to the cellular sub-morphology which may be seen as a (partially) closed porous structure. The increased number of permeable pores makes the lacy sub-morphology also less prone to fouling. Furthermore, the specific surface area in the lacy sub-morphology is higher as compared to the cellular sub-morphology having the same pore size.

Therefore, for the sake of improved filtration properties, a lacy sub-morphology having an open porous structure is preferable over a cellular sub-morphology having a (partially) closed porous structure. In a preferred embodiment of the above-defined porous membrane, the distinct layer having a sponge-like morphology without macrovoids, i.e. the sponge-like layer, has a specific surface area of more than 30 $m^2/g$. More preferably, the specific surface area is more than 33 $m^2/g$, and even more preferably, the specific surface area is more than 35 $m^2/g$. When the specific surface area of the sponge-like layer is more than the above lower limit, the sub-morphology of the sponge-like layer is lacy with an open porous structure, which allows for a higher permeability of the porous membrane. As far as the upper limit of the specific surface area of the sponge-like layer is concerned, the present invention is not particularly limited. An upper limit of the specific surface area rather results from technical limitations. Herein, the specific surface area of the sponge-like layer is measured by performing a normal BET (Brunauer-Emmett-Teller) procedure, as discussed in the experimental section below in more detail.

A sponge-like layer having a lacy sub-morphology with the above specific surface area can be obtained by appropriately adjusting the solvent system comprising 2-pyrrolidone and N-alkyl-2-pyrrolidone. As can be deduced from FIG. 3, there is a transition from a lacy sub-morphology to a cellular sub-morphology, when the content of 2-pyrrolidone becomes less than 25 mass %, with the total mass of 2-pyrrolidone and N-alkyl-2-pyrrolidone being 100 mass %. This transition is reflected by a sharp drop in the specific surface area, reaching values commonly achieved by using conventional solvents like NMP and DMA.

In addition, it is preferable that the thickness of the sponge-like layer falls within a specific range. In a preferred embodiment of the above-defined porous membrane, the distinct layer having a sponge-like morphology without macrovoids, i.e. the sponge-like layer, has a thickness in the range of from 3 μm to 20 μm. More preferably, the thickness ranges from 5 μm to 15 μm, and even more preferably, the thickness ranges from 6 μm to 12 μm. When the thickness of the sponge-like layer falls within the above range, flow resistance on the one hand and mechanical stability on the other hand are balanced, thereby achieving an optimization between the filtration properties and the physical stress resistance of the porous membrane. In order to achieve a sufficiently high mechanical stability, the above lower limit should be satisfied, and in order to achieve a sufficiently low flow resistance, the above upper limit should be satisfied.

The thickness of the sponge-like layer depends on the content ratio of 2-pyrrolidone to N-alkyl-2-pyrrolidone in the solvent system. As can be taken from FIG. 4, the thickness of the sponge-like layer, referred to therein as the sponge layer thickness, decreases, when the content of 2-pyrrolidone in the solvent system decreases. Specifically, the thickness of the sponge-like layer is reduced from 25 μm for pure 2-pyrrolidone to 1.5 μm for pure N-n-butyl-2-pyrrolidone. As indicated above, using pure 2-pyrrolidone as the solvent system results in a lacy sub-morphology of the sponge-like layer with a high specific surface area. However, the use of 2-pyrrolidone in pure form results in an undesirably high thickness of the sponge-like layer, which in turn leads to an undesirably high flow resistance.

Surprisingly, the solvent system used in the method for producing a porous membrane according to the present invention with its specific content ratio of 2-pyrrolidone to N-alkyl-2-pyrrolidone can achieve a sponge-like layer having a lacy sub-morphology with a high specific surface area and having a balanced thickness. Thereby, the porous membrane according to the present invention allows for a high permeability, and thus, for a high performance factor. In contrast thereto, conventional solvents like NMP and DMA lead to porous membranes having a sponge-like layer with an unfavorably low specific surface area (<30 m²/g) and with an unfavorably low thickness (<2 µm), as can be taken from FIG. 3 and FIG. 4, respectively. These porous membranes have a cellular sub-morphology with a (partially) closed porous structure.

Besides, the thickness of the sponge-like layer can also be adjusted by modifying the composition of the solvent system while maintaining the content ratio of 2-pyrrolidone to N-alkyl-2-pyrrolidone constant. For example, a straightforward approach for adjusting the thickness of the sponge-like layer is the addition of water to the solvent system of the casting solution. As can be taken from FIG. 5, the thickness of the sponge-like layer, referred to therein as sponge layer thickness, increases with the amount of water as the precipitation-inducing agent in the solvent system. The SEM images provided in FIG. 6 to FIG. 8 show membrane cross-sections, wherein the content of water in the solvent system used for the production of the porous membrane is 0.25 mass % (FIG. 6), 1 mass % (FIG. 7), and 2 mass % (FIG. 8), respectively, with the total mass of the solvent system, i.e. 2-pyrrolidone, N-alkyl-2-pyrrolidone and water, being 100 mass %. From these SEM images, it can be concluded that the addition of water to the solvent system of the casting solution does not influence the sponge-like morphology, but only influences the thickness of the sponge-like layer. In the same way, the rejection rate of the porous membrane towards a certain target molecule (i.e. the retention) is not influenced. However, and in line with the foregoing, an increase in the thickness of the sponge-like layer leads to a decrease in the permeability of the porous membrane (i.e. the membrane flux), as can be taken from FIG. 9. The retention towards Cytochrome C is, however, not affected.

As mentioned above, the thickness of the porous membrane ranges from 50 µm to 250 µm. The thickness of the porous membrane is the sum of the thickness of the sponge-like layer and the thickness of the macrovoid layer. Determining the thickness of the sponge-like layer and the thickness of the macrovoid layer by means of scanning electron microscopy thus allows for a determination of the thickness of the porous membrane.

In a further aspect, the present invention relates to the use of a solvent system comprising 2-pyrrolidone and N-alkyl-2-pyrrolidone for the production of a porous membrane, wherein the content ratio of 2-pyrrolidone to N-alkyl-2-pyrrolidone in the solvent system is in the range of from 90%:10% to 10%:90%, based on mass %, and N-alkyl-2-pyrrolidone is N-propyl-2-pyrrolidone and/or N-butyl-2-pyrrolidone.

For the use according to the present invention, all definitions provided above for the solvent system used in step (a) of the method for producing a porous membrane according to the present invention are equally applicable.

The present invention allows for the provision of a porous membrane having excellent filtration properties which can be attributed to the specific content ratio and to the specific composition of the solvent system comprising 2-pyrrolidone and N-alkyl-2-pyrrolidone used for the production of the porous membrane. In case the solvent system comprises 2-pyrrolidone and N-n-butyl-2-pyrrolidone, it is even possible to produce a porous membrane in compliance with the more and more restrictive regulations concerning the use of CMR substances. As being non-toxic and readily biodegradable, the future use of such solvent system is secured.

The Figures show:

EXAMPLES

Figure 1:
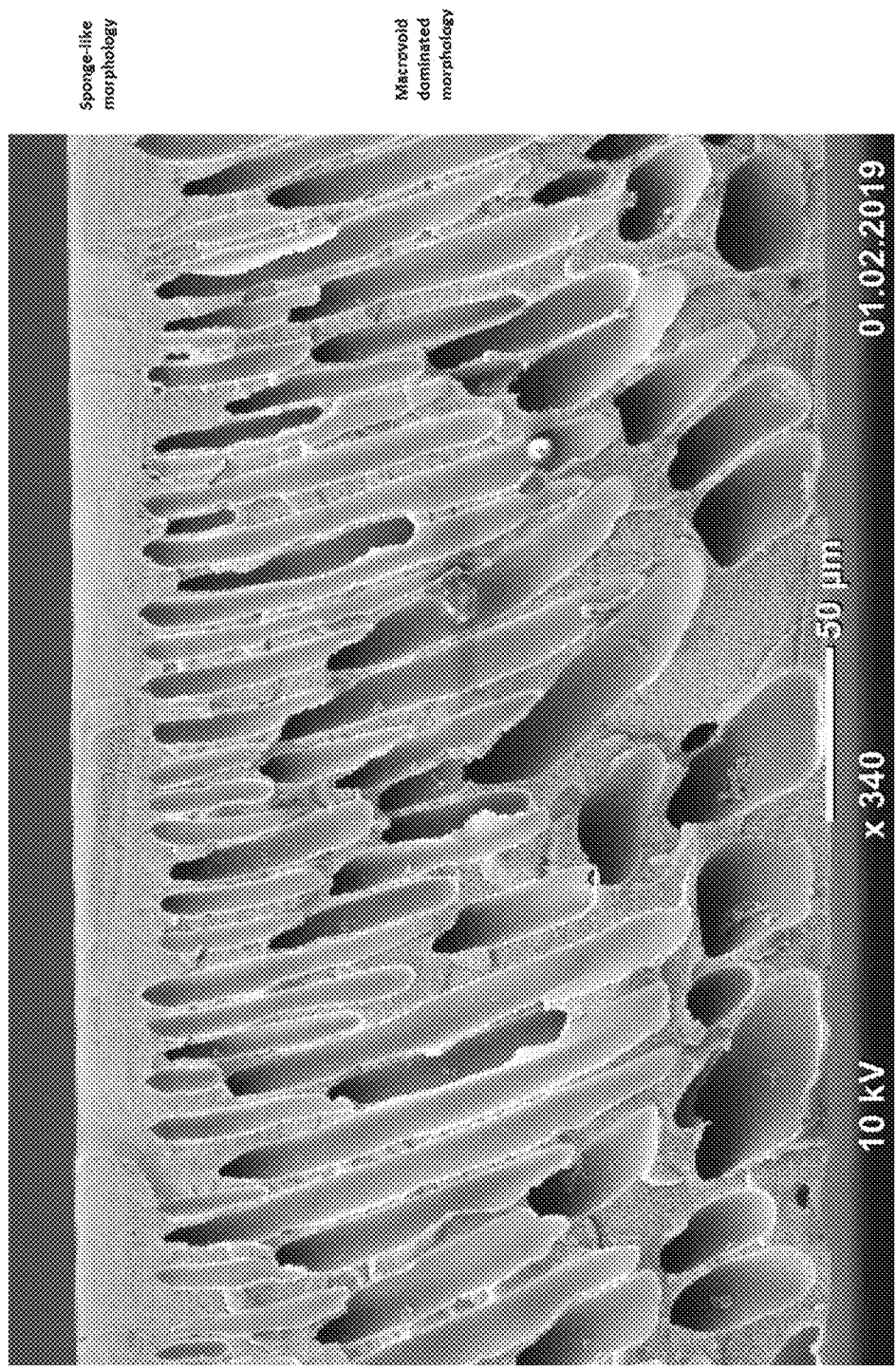
FIG. 1 shows a SEM image of a membrane cross-section of a porous PESu ultrafiltration membrane obtained by the method for producing a porous membrane according to the present invention.
Figure 2B:
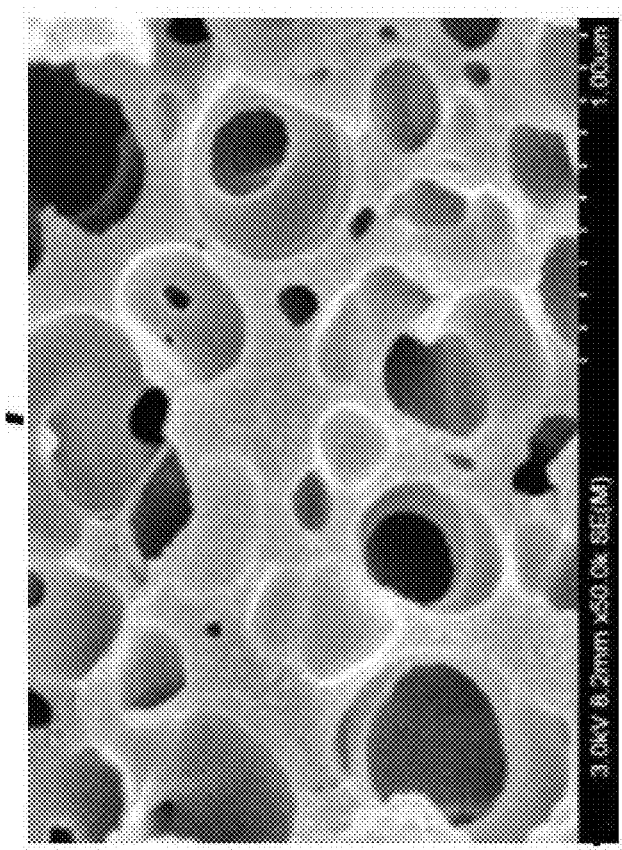
FIG. 2B shows a SEM image of a cellular sub-morphology with a (partially) closed porous structure.
Figure 2A:
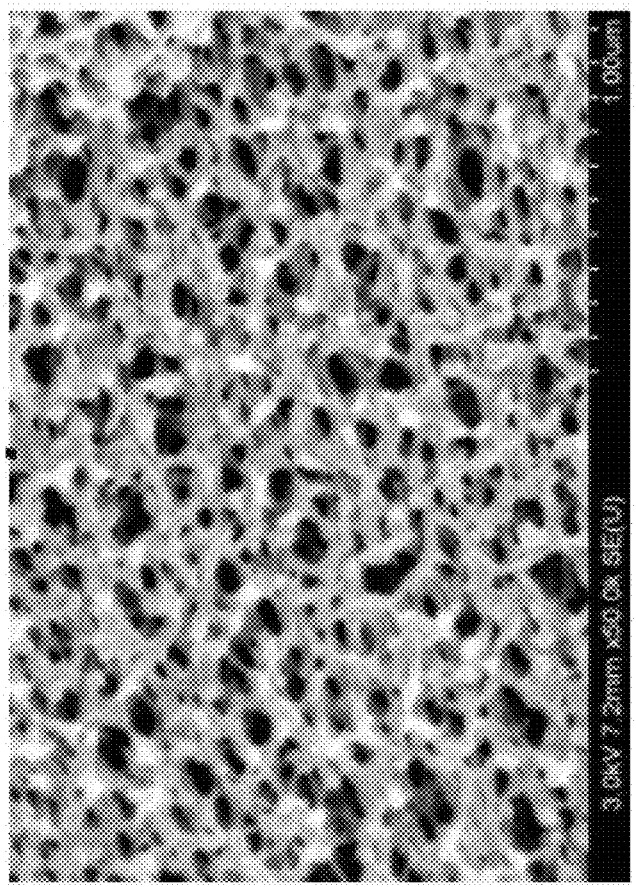
FIG. 2A shows a SEM image of a lacy sub-morphology with an open porous structure.
Figure 3:
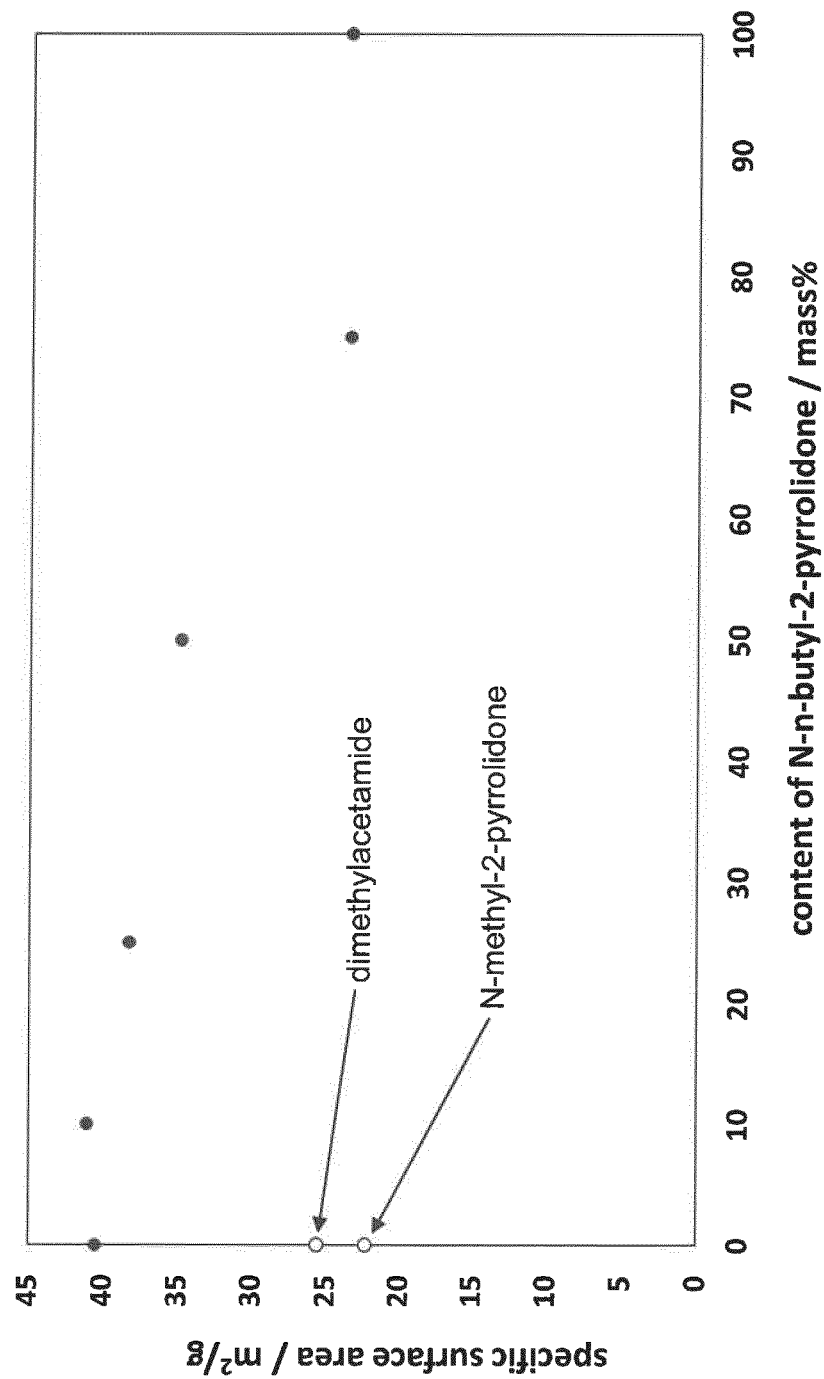
FIG. 3 shows the specific surface area of the sponge-like layer as a function of the content of N-n-butyl-2-pyrrolidone in the solvent system used for the production of the porous membrane.
Figure 4:
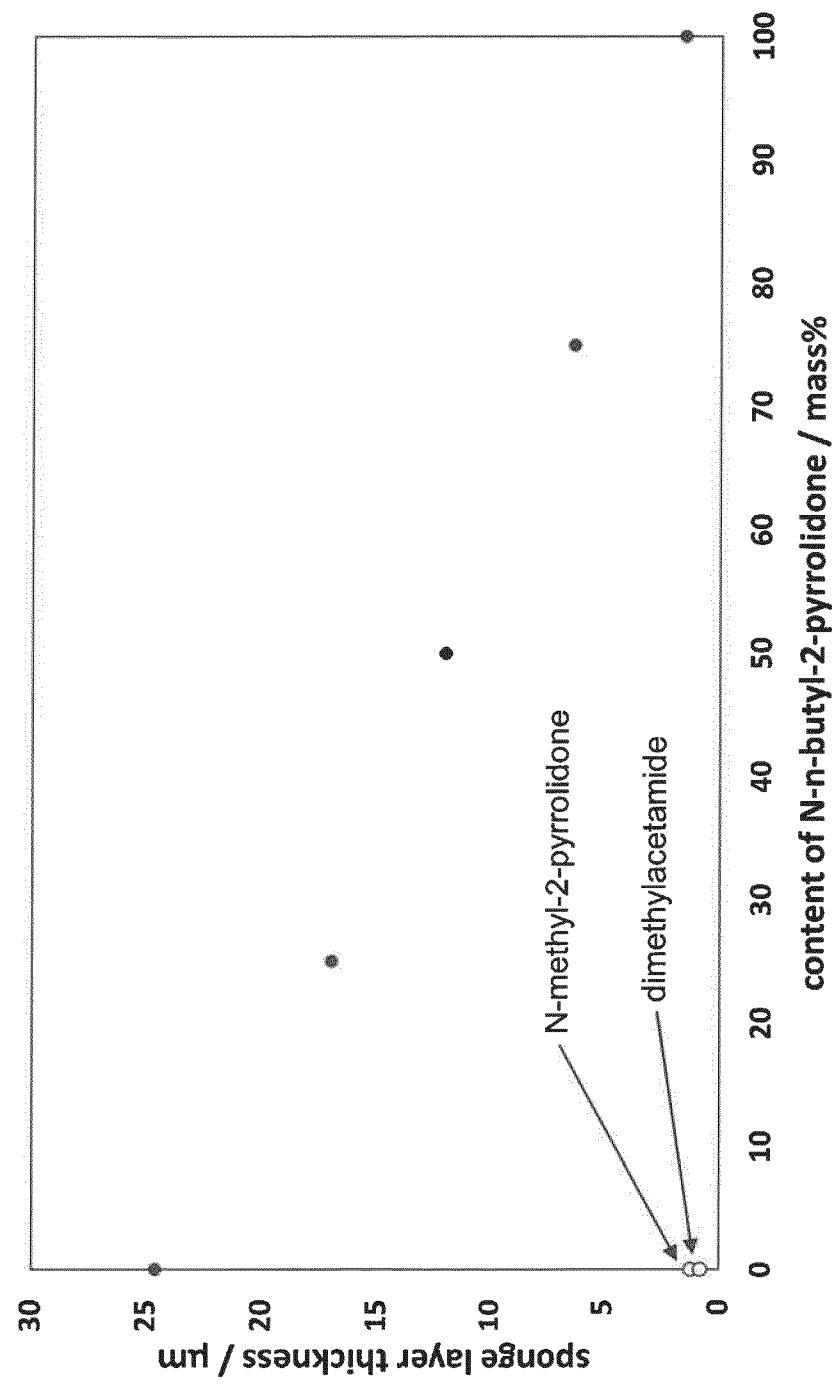
FIG. 4 shows the thickness of the sponge-like layer as a function of the content of N-n-butyl-2-pyrrolidone in the solvent system used for the production of the porous membrane.

The present invention is further illustrated by the following Examples. However, the present invention is not to be construed as being limited thereto:

Hansen Solubility Parameters

A common approach to predict if one material will dissolve in another to form a solution is the use of Hansen Solubility Parameters (HSP). They are based on the idea that like dissolves like, where one molecule is defined as being 'like' another if it binds and interacts to itself in a similar way.

Specifically, a certain molecule can be described using three Hansen Solubility Parameters, each of which is given in units of $MPa^{0.5}$, the three HSP being as follows:

$\delta d$: The energy from dispersion forces between molecules.

$\delta p$: The energy from dipolar intermolecular forces between molecules.

$\delta h$: The energy from hydrogen bonds between molecules.

The Hansen Solubility Parameters of polyethersulfone (PESu), 2-pyrrolidone (2-P), N-n-butyl-2-pyrrolidone (NBP), N-methyl-2-pyrrolidone (NMP) and dimethylacetamide (DMA) are given in Table 1:

TABLE 1

| component | $\delta d/MPa^{0.5}$ | $\delta p/MPa^{0.5}$ | $\delta h/MPa^{0.5}$ |
|---|---|---|---|
| PESu | 19.6 | 10.8 | 9.2 |
| 2-P | 18.0 | 16.6 | 7.4 |
| NBP | 17.8 | 5.9 | 8.2 |
| NMP | 18.0 | 12.3 | 7.2 |
| DMA | 16.8 | 11.5 | 10.2 |

In order to assess the similarity of two components, a distance function is commonly applied as given in Formula (1):

$$R=\sqrt{4\cdot(\delta d_1-\delta d_2)^2+(\delta p_1-\delta p_2)^2+(\delta h_1-\delta h_2)^2} \qquad (1)$$

In Formula (1), R is the distance value. The lower the distance value, the higher the similarity between the two components.

Using an approximation of a linear contribution of solvent properties, the distance values R given in Table 2 can be calculated for pure solvents and mixtures of 2-P and NBP in relation to PESu:

TABLE 2

| $1^{st}$ component | $2^{nd}$ component | R |
|---|---|---|
| 2-P | — | 6.86 |
| NBP | — | 6.16 |
| NMP | — | 4.06 |
| DMA | — | 5.73 |
| 2-P (90%) | NBP (10%) | 5.99 |
| 2-P (80%) | NBP (20%) | 5.18 |
| 2-P (70%) | NBP (30%) | 4.49 |
| 2-P (60%) | NBP (40%) | 3.97 |
| 2-P (50%) | NBP (50%) | 3.70 |
| 2-P (40%) | NBP (60%) | 3.74 |
| 2-P (30%) | NBP (70%) | 4.06 |
| 2-P (20%) | NBP (80%) | 4.62 |
| 2-P (10%) | NBP (90%) | 5.34 |

This calculation shows that surprisingly, a mixture of 2-pyrrolidone (2-P) and N-n-butyl-2-pyrrolidone (NBP) with a specific content ratio can yield a lower distance value than conventional solvents like NMP and DMA.

Experimental Methods

Membrane Production on a Laboratory Scale

The production of membrane samples was performed on lab scale. The casting solution was provided using a stirred vessel with a temperature control unit. The casting solution components were added in the following order:

| | |
|---|---|
| solvent system: | 2-P, NBP or other solvents |
| hydrophilic additive: | PEG 400 (polyethylene glycol) |
| hydrophilic additive: | PVP K30 (polyvinylpyrrolidone) |
| membrane-forming polymer: | PESu E6020 P (polyethersulfone) |

The resulting suspension was stirred under 250 rpm at 60° C. for 24 h to ensure complete dissolution of the non-solvent components. The homogenous solution obtained was then stirred under 5 rpm at 60° C. for another 3 h to perform a degassing procedure. After cooling to room temperature, a portion of the resulting solution was placed on a glass plate and formed to a homogenous film using a casting rake in an initial thickness reflecting the desired thickness of the final membrane, which was 150 μm.

With minimum contact time to ambient atmosphere, the polymer film was transferred to a gently agitated water bath to induce membrane formation by the exchange of solvent and non-solvent. The membrane was allowed to form for 5 minutes before being transferred to another bath containing glycerin in water. The membrane was allowed to impregnate for 10 minutes before being dried at 50° C. for 15 minutes.

After the formation, the membrane was stored at ambient conditions until being subject to further characterization.

Determination of Bulk Structure

Scanning electron microscopy (JEOL Benchtop 6000) was used to investigate the bulk structure of the porous membrane, and to evaluate the thickness of the distinct layer having a sponge-like morphology without macrovoids and the thickness of the distinct layer having a macrovoid dominated morphology. The respective membrane samples were coated with gold prior to investigation. SEM images were obtained using an acceleration voltage between 2 kV and 20 kV, and a spot-size of from 1.0 to 8.0 in a high vacuum. Secondary electrons were detected using an Everhart-Thornley detector.

Determination of Specific Surface Area

A normal BET procedure (Gemini apparatus, 11 point method) was applied for determining the specific surface area of the sponge-like layer in the respective membrane samples.

The volume of gas (usually nitrogen) adsorbed to the surface of the membrane was measured at the boiling point of nitrogen (−196° C.). At this temperature, the nitrogen gas was below its critical temperature and condensed on the surface of the membrane. It is assumed that the gas condenses on the surface in a monolayer so that, since the size of the gas atom/molecule is known, the amount of adsorbed (condensed) gas can be correlated with the total surface area including the pores at the surface (inaccessible pores are not detected).

When the gas (adsorptive) is pumped into the sample tube, the gas covers both the external and the accessible internal pore surface of the membrane. In BET theory, the sample is covered with a monolayer of adsorbate.

The BET equation can be used to calculate the surface area of the sample. Other equations are available to calculate surface areas from gas adsorption. However, BET is the most popular. The derivation of the BET equation is, for example, described in "Adsorption of Gases in Multimolecular Layers", S. Brunauer et al., J. Am. Chem. Soc., 60(2), 309-319, 1938 (DOI: 10.1021/ja01269a023). Herein, it is sufficient to show that the measured inputs to this equation are:

the equilibrium pressure p and the saturation pressure $p_0$ of the adsorbate at the temperature of adsorption the adsorbed gas quantity V (in terms of volume)

The BET equation is represented by Formula (2):

$$\frac{p}{V\cdot(p_0-p)}=\frac{1}{V_{mono}\cdot C}+\frac{C-1}{V_{mono}\cdot C}\cdot\frac{p}{p_0} \qquad (2)$$

The values to be calculated are:

the monolayer capacity $V_{mono}$ (in terms of volume)

the BET constant C

To calculate the above values $V_{mono}$ and C, the BET equation was plotted as an adsorption isotherm typically at a relative pressure $p/p_0$ between 0.05 and 0.3. In this range, BET theory suggests that it should form a straight line. The values $V_{mono}$ and C can then be calculated from the slope and the intercept. Next, the total surface area $S_{total}$ can be calculated in accordance with Formula (3) using the molecular cross-sectional area:

$$S_{total} = \frac{V_{mono} \cdot N_A \cdot s}{V_{molar}} \quad (3)$$

In Formula (3), $N_A$ is the Avogadro constant, s is the adsorption cross-section of the adsorbing species, and $V_{molar}$ is the molar volume of the adsorbate.

The specific surface area $S_{specific}$ can then be calculated in accordance with Formula (4) using the mass m of the sample:

$$S_{specific} = \frac{S_{total}}{m} \quad (4)$$

Determination of Permeability (Membrane Flux)

The permeability of the porous membrane was determined in terms of the membrane flux by filtering a pure component or a mixture through a membrane sample at defined conditions. Specifically, the method applied for determining the membrane flux was as follows:

The standard operation procedure included the filtration under constant pressure using a round membrane sample with a diameter of 26 mm. The sample was checked for visible defects and was then integrated with a non-woven support into a stirring cell facing the sponge-like layer side up. The effective filtration area was 3.8 cm².

The stirring cell was filled with 10.5 mL of an aqueous solution containing 0.9 mass % NaCl. The filtration was conducted under a pressure of 1 bar and under a stirring rate of 1100 rpm in order to simulate crossflow conditions. 10 mL of the filtrate were collected while the time was recorded in parallel.

The membrane flux of the sample under investigation can be calculated in accordance with Formula (5):

$$J = \frac{V}{A \cdot \Delta t \cdot \Delta p} \quad (5)$$

In Formula (5), J is the membrane flux, V is the filtered volume (corresponding to the volume of the filtrate), A is the membrane filtration area, $\Delta t$ is the measured time, and $\Delta p$ is the applied pressure. The membrane flux is given in units of L/(m²×h×bar).

Determination of Rejection Rate (Retention)

The rejection rate of a membrane can be evaluated using various methods. Herein, the values determined rely on the determination of the retention for a protein marker molecule, either Cytochrome C or Bovine Serum Albumin (BSA), dissolved in an aqueous NaCl solution. The retention is a dimensionless quantity ranging from 0 to 1, wherein 0 indicates no retention and 1 indicates complete retention of the marker molecule. Specifically, the method applied for determining the retention was as follows:

A stirring cell was filled with 10 mL of the marker molecule solution. The filtration was conducted under a pressure of 1 bar and under a stirring rate of 1100 rpm in order to simulate crossflow conditions.

Table 3 lists the content of the marker molecule in the aqueous NaCl solution and further lists the salt concentration thereof.

TABLE 3

| marker molecule | content | NaCl concentration |
| --- | --- | --- |
| Cytochrome C/ Bovine Serum Albumin | 0.1 mass % | 0.15M |

In addition, Table 4 lists the absorption wavelengths of both Cytochrome C and Bovine Serum Albumin for UV/Vis spectroscopy.

TABLE 4

| marker molecule | wavelength |
| --- | --- |
| Bovine Serum Albumin | 280 nm |
| Cytochrome C | 550 nm |

Herein, for determining the retention of polyethersulfone (PESu) ultrafiltration membranes, Cytochrome C was used as the marker molecule, and for determining the retention of cellulose acetate (CA) ultrafiltration membranes, Bovine Serum Albumin was used as the marker molecule.

In a first step, 9.5 mL of the protein solution was filtered through the membrane under constant pressure and the filtrate was collected. Afterwards, the stirring cell was flushed with an aqueous solution containing 0.9 mass % of NaCl. In a second step, the stirring cell was filled with 5 mL of the above aqueous solution containing 0.9 mass % of NaCl, and an additional volume of 2.5 mL was filtered through the membrane and collected in the filtrate. Subsequently, the extinction (absorbance) of the filtrate with a total volume of 12 mL was measured.

The retention R of the sample under investigation can be calculated using Formula (6):

$$R = \left(1 - \frac{\ln\left(1 - \frac{E_F \cdot V_M}{E_S \cdot V_A}\right)}{\ln\left(1 - \frac{V_F}{V_A}\right)}\right) \quad (6)$$

In Formula (6), R is the retention, $E_F$ is the extinction (absorbance) of the filtrate, $E_S$ is the extinction (absorbance) of the original marker molecule solution, $V_A$ is the starting volume of the original marker molecule solution (10 mL), $V_F$ is the volume of the filtrate after the first filtration step (9.5 mL), and VM is the volume of the filtrate after the second filtration step (12 mL).

Formula (6) can be derived as follows, wherein $c_R$ is the concentration of the marker molecule in the retentate and $c_F$ is the concentration of the marker molecule in the filtrate:

$$R = \frac{c_R - c_F}{c_R}$$

$$c_F = c_R \cdot (1 - R)$$

The concentration of the marker molecule in the retentate $C_R$ and the concentration of the marker molecule in the filtrate $c_F$ can be expressed as follows, where P is the marker molecule mass in the retentate, dP is an infinitesimal change of the marker molecule mass in the retentate, V is the volume of the retentate, and dV is an infinitesimal change of the volume of the retentate:

$$c_F = \frac{dP}{dV} \quad c_R = \frac{P}{V}$$

Rearrangement and integration leads to the following, where $P_0$ is the marker molecule mass in the retentate at the start of the filtration (e.g. 10 mg in the original marker molecule solution, corresponding to 0.1 mass %), $P_E$ is the marker molecule mass in the retentate at the end of the filtration, $V_A$ is the volume of the retentate at the start of the filtration corresponding to the starting volume of the original marker molecule solution (10 mL), and $V_E$ is the volume of the retentate at the end of the filtration:

$$\frac{dP}{dV} = \frac{P}{V} \cdot (1-R)$$

$$\frac{dP}{P} = \frac{dV}{V} \cdot (1-R)$$

$$\int_{P_0}^{P_E} \frac{1}{P} dP = (1-R) \cdot \int_{V_A}^{V_E} \frac{1}{V} dV$$

$$\ln\left(\frac{P_E}{P_0}\right) = (1-R) \cdot \ln\left(\frac{V_E}{V_A}\right)$$

The marker molecule mass in the retentate at the end of the filtration $P_E$ and the volume of the retentate at the end of the filtration $V_E$ can be expressed as follows, where $P_F$ is the marker molecule mass in the filtrate, and $V_F$ is the volume of the filtrate after the first filtration step (9.5 mL), as mentioned above:

$$P_E = P_0 - P_F \quad V_E = V_A - V_F$$

Rearrangement leads to the following, taking into account that the extinction (absorbance) is proportional to the concentration:

$$\ln\left(\frac{P_0 - P_F}{P_0}\right) = (1-R) \cdot \ln\left(\frac{V_A - V_F}{V_A}\right) \quad (6)$$

$$\ln\left(1 - \frac{P_F}{P_0}\right) = (1-R) \cdot \ln\left(1 - \frac{V_F}{V_A}\right)$$

$$R = 1 - \frac{\ln\left(1 - \frac{P_F}{P_0}\right)}{\ln\left(1 - \frac{V_F}{V_A}\right)}$$

$$R = \left(1 - \frac{\ln\left(1 - \frac{E_F \cdot V_M}{E_s \cdot V_A}\right)}{\ln\left(1 - \frac{V_F}{V_A}\right)}\right)$$

Performance Factor

As an indicator of the filtration properties of a membrane sample, the performance factor P can be defined in accordance with Formula (7), which is the product of the membrane flux J and the retention R towards a specific marker molecule to be cut off.

$$P = J \cdot R \quad (7)$$

The performance factor is given in units of $L/(m^2 \times h \times bar)$, as it is the case for the membrane flux J, taking into account that the retention R is a dimensionless quantity ranging from 0 to 1. The membrane flux and the retention are measured as described above.

PESu Ultrafiltration Membranes

As an example, a reference casting solution for polyethersulfone (PESu) ultrafiltration membranes was prepared and the solvent system thereof was varied from pure 2-pyrrolidone to pure N-n-butyl-2-pyrrolidone. Table 5 lists the composition of the reference casting solution with its varying solvent contents.

TABLE 5

| component of casting solution | content thereof (in total 100 mass %) |
|---|---|
| polyethersulfone (PESu E 6020 P) | 20% |
| polyvinylpyrrolidone (PVP K30) | 8.25% |
| polyethylene glycol (PEG 400) | (combined) |
| 2-pyrrolidone | x % |
| N-n-butyl-2-pyrrolidone | 71.75-x % |

In the above reference casting solution, the content of the (hydrophilic) additives polyvinylpyrrolidone and polyethylene glycol amounted to 8.25 mass %, with the total mass of the membrane-forming polymer, the solvent system and the additives being 100 mass %. Further, the content of the membrane-forming polymer was 21.8 mass % and the content of the solvent system was 78.2 mass %, with the total mass of the membrane-forming polymer and the solvent system being 100 mass %.

Figure 10:
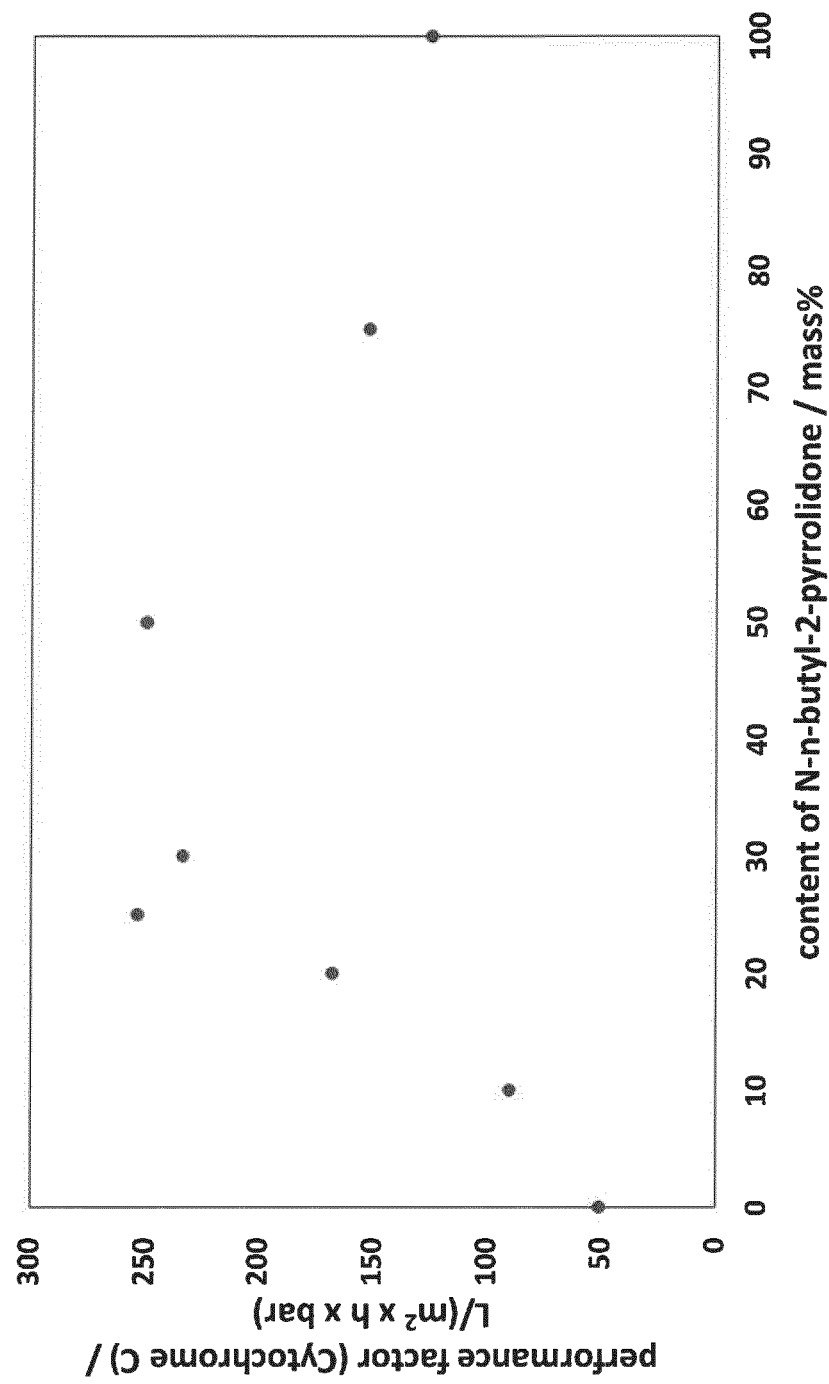
FIG. 10 shows the performance factor of a porous PESu ultrafiltration membrane as a function of the content of N-n-butyl-2-pyrrolidone in the solvent system used for the production of the porous membrane.

The resulting performance factors of the PESu ultrafiltration membranes are shown in FIG. 10.

It can be taken from FIG. 10 that a maximum of the performance factor can be achieved when the content of N-n-butyl-2-pyrrolidone falls within the range of from 20 to 50 mass %, with the total mass of 2-pyrrolidone and N-n-butyl-2-pyrrolidone being 100 mass %. Surprisingly, this corresponds very well to the distance values R shown in Table 2. Furthermore, it can be taken from FIG. 10 that the performance factor can be significantly increased compared to the performance factors achieved by using the pure solvents 2-pyrrolidone and N-n-butyl-2-pyrrolidone. This becomes also evident from the following Working Examples and Comparative Examples:

Production of a porous membrane using a solvent system comprising 2-pyrrolidone and N-n-butyl-2-pyrrolidone (Working Examples)

(1) Content ratio of 2-pyrrolidone to N-n-butyl-2-pyrrolidone in the solvent system being 70% to 30%, based on mass %

A casting solution was prepared according to the method described above with the composition shown in Table 6:

TABLE 6

| component of casting solution | content thereof (in total 100 mass %) |
|---|---|
| polyethersulfone (PESu E 6020 P) | 20% |
| polyvinylpyrrolidone (PVP K30) | 8.25% |
| polyethylene glycol (PEG 400) | (combined) |
| 2-pyrrolidone | 50.25% |
| N-n-butyl-2-pyrrolidone | 21.5% |

The membranes were prepared and characterized according to the methods described above. A membrane performance factor of 233 $L/(m^2 \times h \times bar)$ could be determined.

(2) Content ratio of 2-pyrrolidone to N-n-butyl-2-pyrrolidone in the solvent system being 50% to 50%, based on mass %

A casting solution was prepared according to the method described above with the composition shown in Table 7:

TABLE 7

| component of casting solution | content thereof (in total 100 mass %) |
|---|---|
| polyethersulfone (PESu E 6020 P) | 20% |
| polyvinylpyrrolidone (PVP K30) | 8.25% |
| polyethylene glycol (PEG 400) | (combined) |
| 2-pyrrolidone | 35.875% |
| N-n-butyl-2-pyrrolidone | 35.875% |

The membranes were prepared and characterized according to the methods described above. A membrane performance factor of 249 L/(m²×h×bar) could be determined.

Production of a porous membrane using pure 2-pyrrolidone or pure N-n-butyl-2-pyrrolidone (Comparative Examples)

(1) Content ratio of 2-pyrrolidone to N-n-butyl-2-pyrrolidone in the solvent system being 100% to 0%, based on mass %

A casting solution was prepared according to the method described above with the composition shown in Table 8:

TABLE 8

| component of casting solution | content thereof (in total 100 mass %) |
|---|---|
| polyethersulfone (PESu E 6020 P) | 20% |
| polyvinylpyrrolidone (PVP K30) | 8.25% |
| polyethylene glycol (PEG 400) | (combined) |
| 2-pyrrolidone | 71.75% |
| N-n-butyl-2-pyrrolidone | 0% |

The membranes were prepared and characterized according to the methods described above. A membrane performance factor of 51 L/(m²×h×bar) could be determined.

(2) Content ratio of 2-pyrrolidone to N-n-butyl-2-pyrrolidone in the solvent system being 0% to 100%, based on mass %

A casting solution was prepared according to the method described above with the composition shown in Table 9:

TABLE 9

| component casting solution | of content thereof (in total 100 mass %) |
|---|---|
| polyethersulfone (PESu E 6020 P) | 20% |
| polyvinylpyrrolidone (PVP K30) | 8.25% |
| polyethylene glycol (PEG 400) | (combined) |
| 2-pyrrolidone | 0% |
| N-n-butyl-2-pyrrolidone | 71.75% |

The membranes were prepared and characterized according to the methods described above. A membrane performance factor of 126 L/(m²×h×bar) could be determined.

Production of a porous membrane using a solvent system comprising 2-pyrrolidone, N-n-butyl-2-pyrrolidone and water (Working Example)

Figure 5:
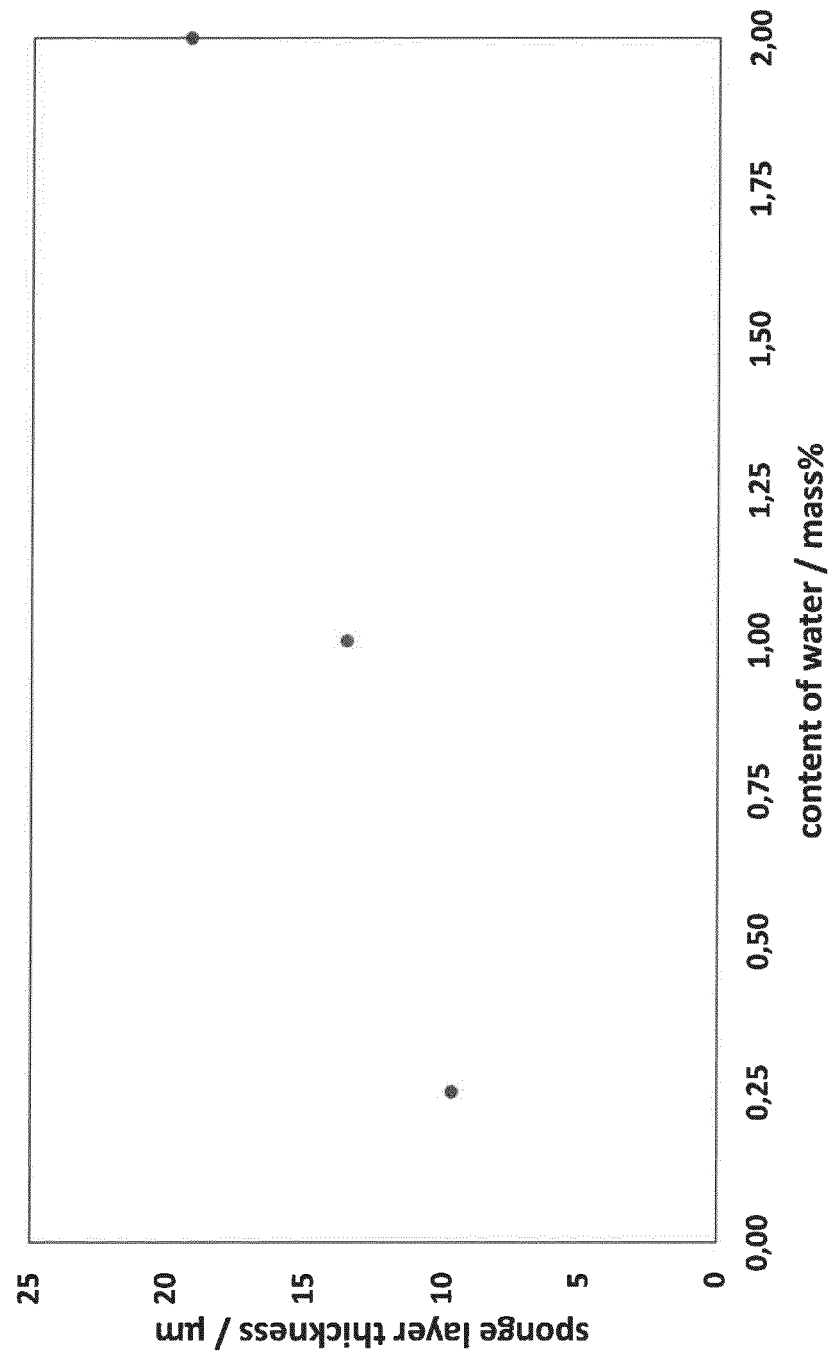
FIG. 5 shows the thickness of the sponge-like layer as a function of the content of water in the solvent system used for the production of the porous membrane.
Figure 9:
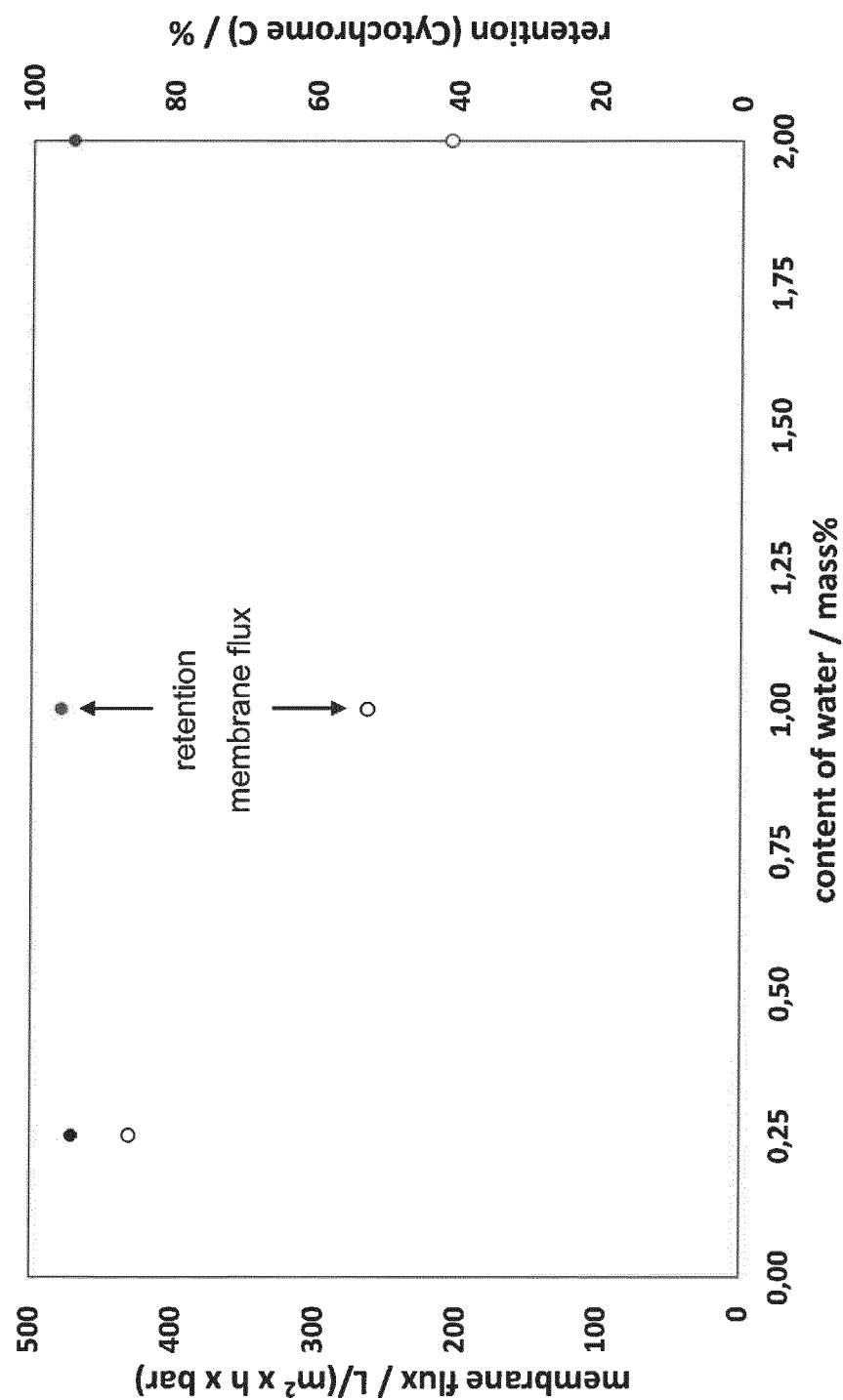
FIG. 9 shows the membrane flux and the retention as a function of the content of water in the solvent system used for the production of the porous membrane.

As discussed above, the addition of water to the solvent system of the casting solution has an influence on the thickness of the sponge-like layer, as it is shown in FIG. 5, which in turn has an influence on the permeability of the porous membrane (i.e. the membrane flux), but not on the rejection rate (i.e. the retention), as it is shown in FIG. 9.

For studying the effect of adding water to the casting solution, a reference casting solution was prepared, having the composition shown in Table 10.

TABLE 10

| component casting solution | of content thereof (in total 100 mass %) |
|---|---|
| polyethersulfone (PESu E 6020 P) | 18% |
| polyvinylpyrrolidone (PVP K30) | 8.25% |
| polyethylene glycol (PEG 400) | (combined) |
| 2-pyrrolidone | 55.3125% |
| N-n-butyl-2-pyrrolidone | 18.4375% |

In the reference casting solution, the content of the (hydrophilic) additives polyvinylpyrrolidone and polyethylene glycol amounted to 8.25 mass %, with the total mass of the membrane-forming polymer, the solvent system and the additives being 100 mass %. Further, the content of the membrane-forming polymer was 19.6 mass % and the content of the solvent system was 80.4 mass %, with the total mass of the membrane-forming polymer and the solvent system being 100 mass %. The content ratio of 2-pyrrolidone to N-n-butyl-2-pyrrolidone in the solvent system was 75% to 25%, based on mass %.

Next, 2-pyrrolidone and N-n-butyl-2-pyrrolidone in the solvent system were equally replaced by water with a content ranging from 0.25 mass % to 2 mass %, with the total mass of the solvent system being 100 mass %. Membrane samples were prepared and characterized as described above.

Figure 6:
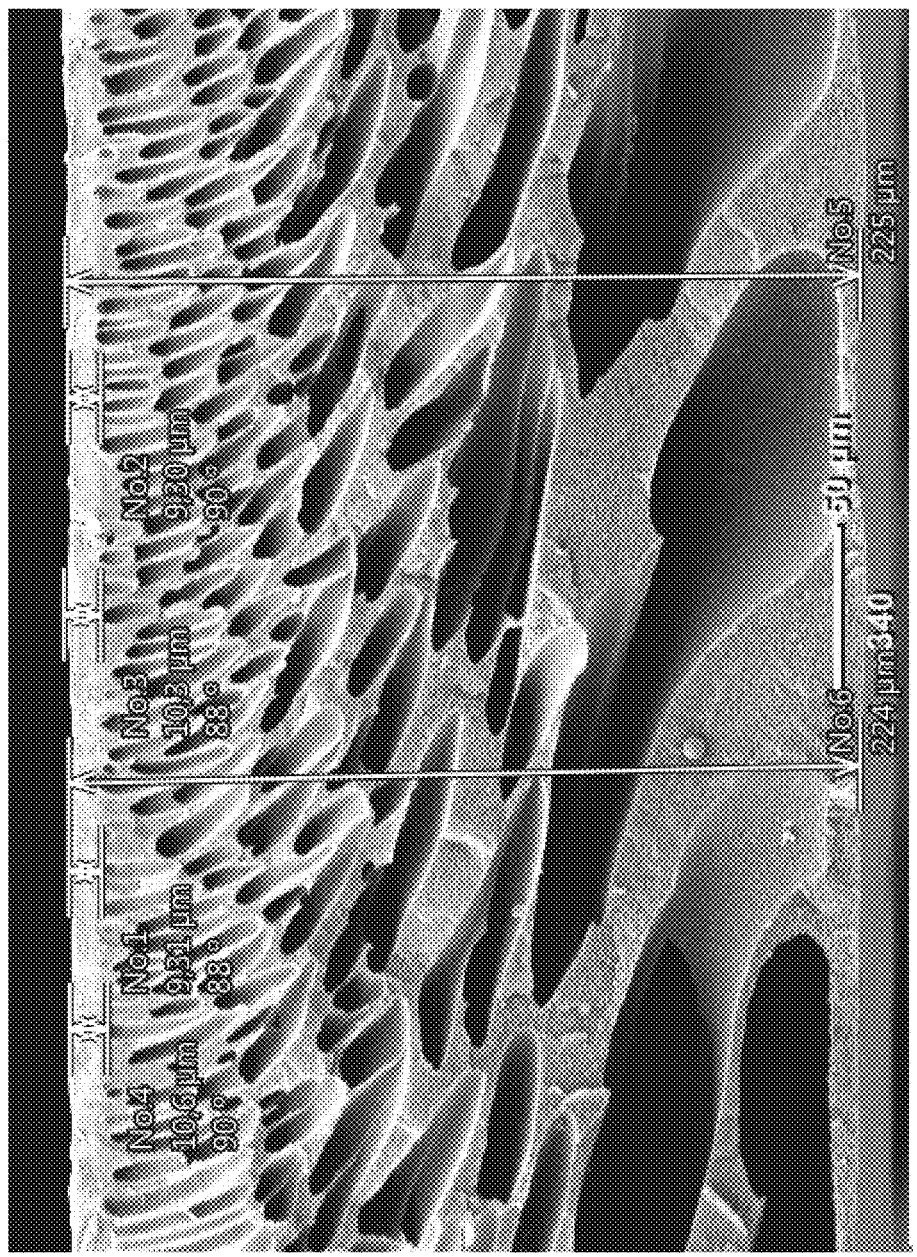
FIG. 6 shows a SEM image of a membrane cross-section, wherein the content of water in the solvent system used for the production of the porous membrane is 0.25 mass %.
Figure 7:
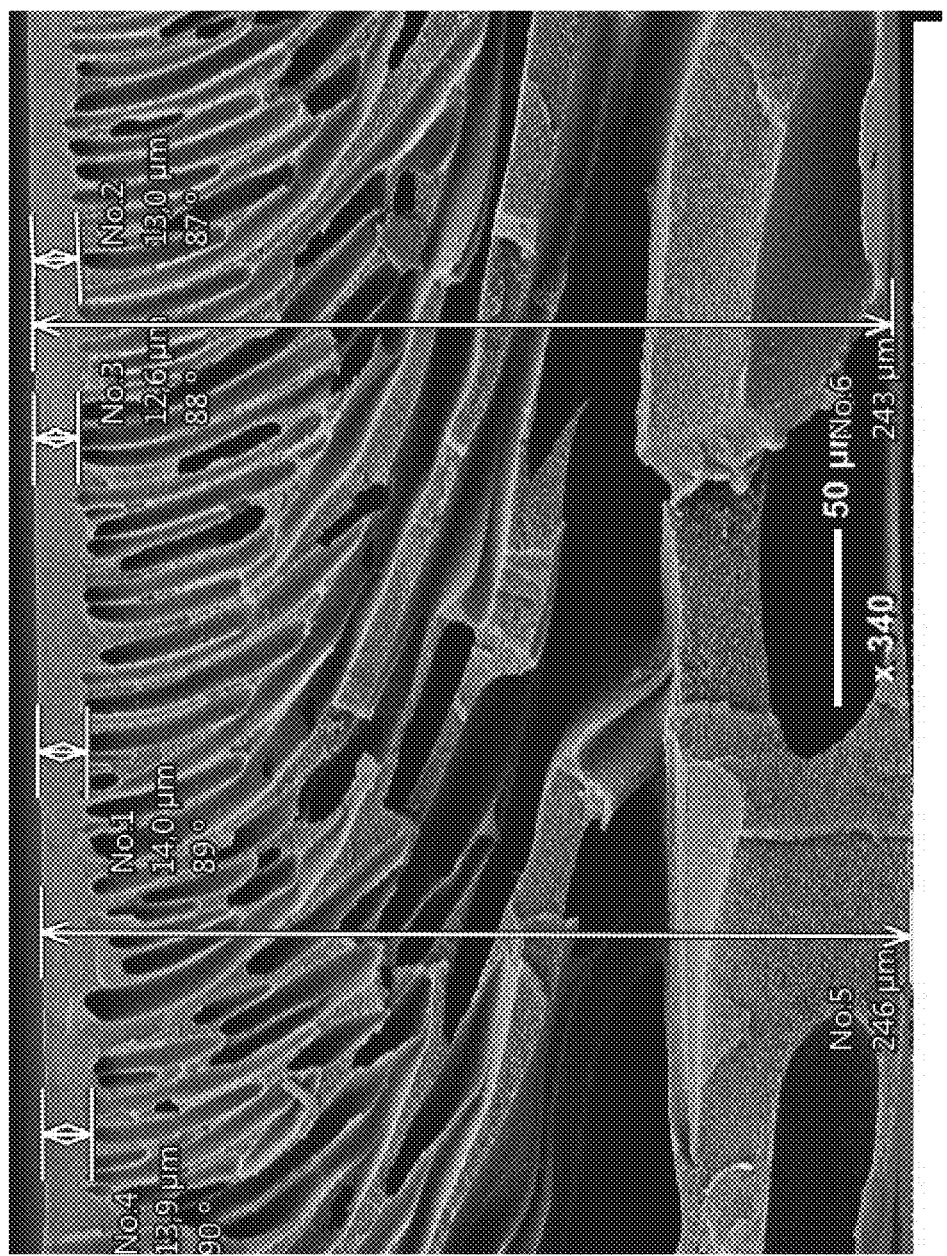
FIG. 7 shows a SEM image of a membrane cross-section, wherein the content of water in the solvent system used for the production of the porous membrane is 1 mass %.
Figure 8:
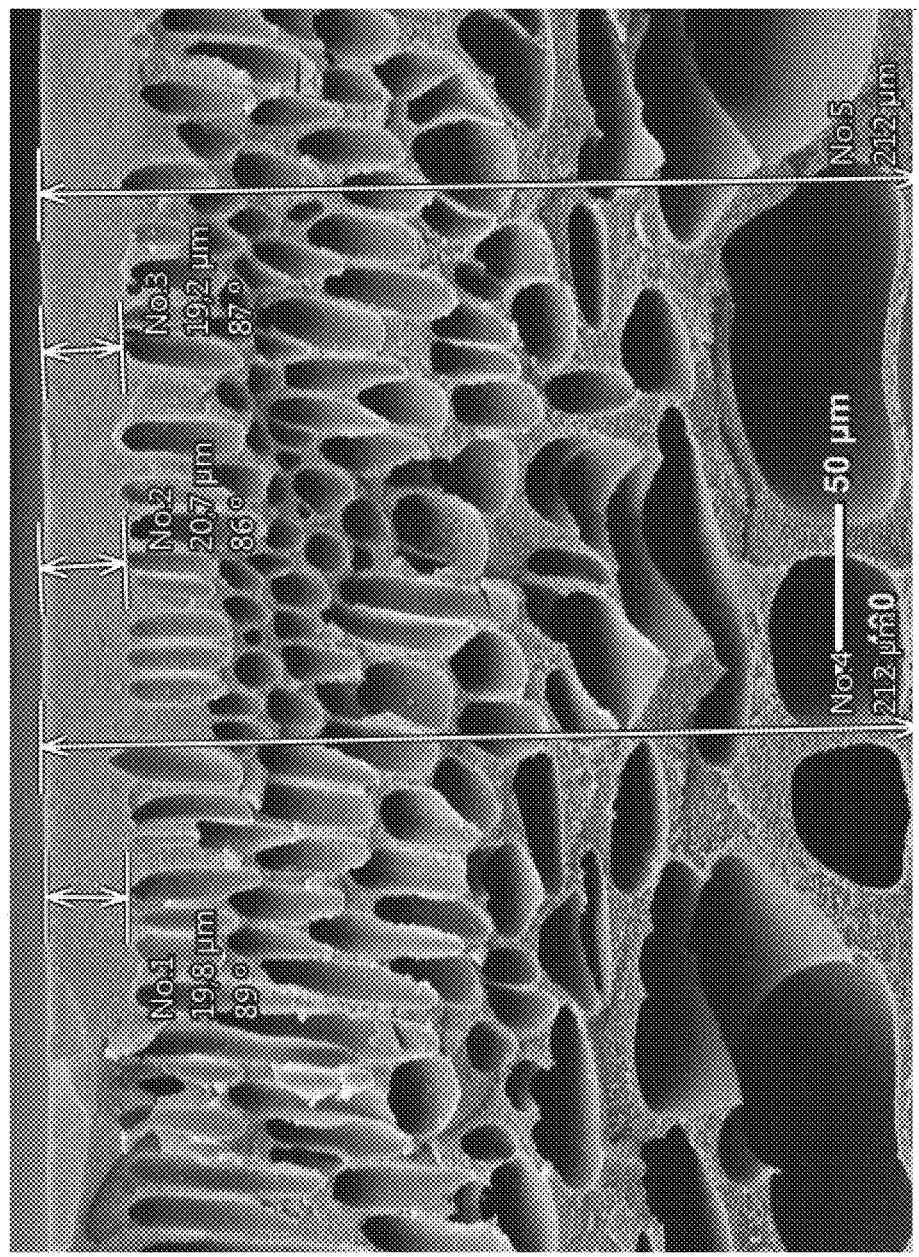
FIG. 8 shows a SEM image of a membrane cross-section, wherein the content of water in the solvent system used for the production of the porous membrane is 2 mass %.

As can be taken from FIG. 6 to FIG. 8, the thickness of the sponge-like layer increased with the amount of water in the solvent system and amounted to an average value of 9.87 μm for the membrane shown in FIG. 6, 13.38 μm for the membrane shown in FIG. 7, and 19.90 μm for the membrane shown in FIG. 8. Specifically, the thickness of the sponge-like layer was doubled by the addition of 2 mass % water. Due to the increased thickness of the sponge-like layer, the permeability of the porous membrane (i.e. the membrane flux) decreased. On the other hand, the rejection rate (i.e. the retention) remained almost constant within the measurement accuracy.

As found by the present inventors, a residual amount of water, which may be seen as always present in the solvent system, at least at a trace level, did not influence the morphology of the sponge-like layer. In particular, in all the membrane samples investigated, the addition of water to the casting solution did not alter the lacy sub-morphology of the sponge-like layer. That is, in each membrane sample under investigation, the specific surface area of the sponge-like layer was more than 30 m²/g, indicating an open porous structure.

CA Ultrafiltration Membranes

As another example, a reference casting solution for cellulose acetate (CA) ultrafiltration membranes was prepared in the same way as described above, and the solvent system thereof was varied from 25 mass % N-n-butyl-2-pyrrolidone to pure N-n-butyl-2-pyrrolidone, with the total mass of the solvent system being 100 mass %. Table 11 lists the composition of the reference casting solution with its varying solvent contents.

TABLE 11

| component of casting solution | content thereof (in total 100 mass %) |
|---|---|
| cellulose acetate (cellulose diacetate L50 Daicel) | 10% |
| polyvinylpyrrolidone (PVP K30) | 8.25% |
| polyethylene glycol (PEG 400) | (combined) |
| 2-pyrrolidone | x % |
| N-n-butyl-2-pyrrolidone | 81.75-x % |

In the above reference casting solution, the content of the (hydrophilic) additives polyvinylpyrrolidone and polyethylene glycol amounted to 8.25 mass %, with the total mass of the membrane-forming polymer, the solvent system and the additives being 100 mass %. Further, the content of the membrane-forming polymer was 10.9 mass % and the content of the solvent system was 89.1 mass %, with the total mass of the membrane-forming polymer and the solvent system being 100 mass %.

Figure 11:
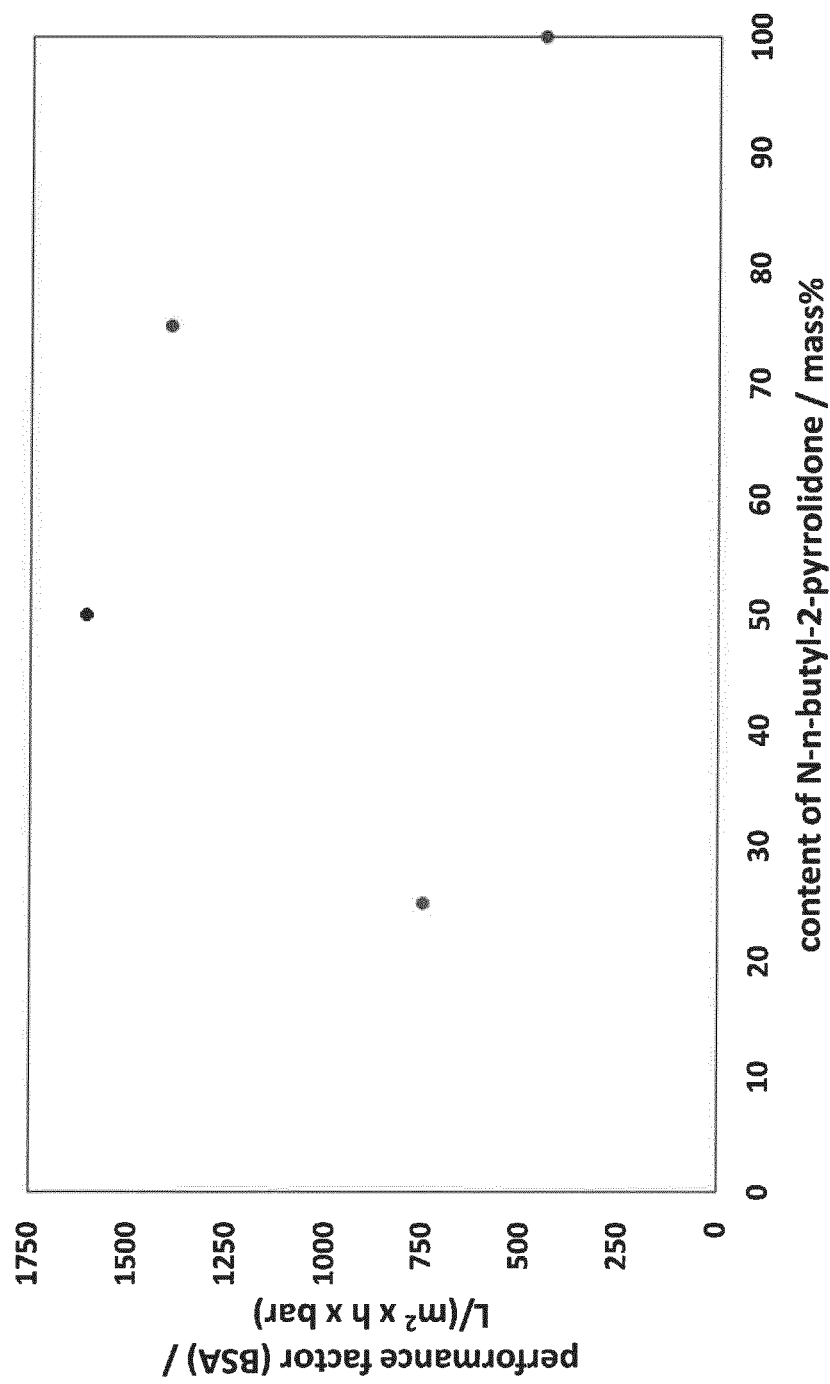
FIG. 11 shows the performance factor of a porous CA ultrafiltration membrane as a function of the content of N-n-butyl-2-pyrrolidone in the solvent system used for the production of the porous membrane.

The resulting performance factors of the CA ultrafiltration membranes are shown in FIG. 11.

It can be taken from FIG. 11 that a maximum of the performance factor can be achieved when the content of N-n-butyl-2-pyrrolidone is about 50 mass %, with the total mass of 2-pyrrolidone and N-n-butyl-2-pyrrolidone being 100 mass %. Furthermore, it can be taken from FIG. 11 that the performance factor can be significantly increased compared to the performance factor achieved by using the pure solvent N-n-butyl-2-pyrrolidone.

PSu Ultrafiltration Membranes

As yet another example, a reference casting solution for polysulfone (PSu) ultrafiltration membranes was prepared in the same way as described above, and the solvent system thereof contained 75 mass % 2-pyrrolidone and 25 mass % N-n-butyl-2-pyrrolidone, with the total mass of the solvent system being 100 mass %. Table 12 lists the composition of the reference casting solution with its varying solvent contents.

TABLE 12

| component of casting solution | content thereof (in total 100 mass %) |
|---|---|
| polysulfone (PSf) | 18% |
| polyvinylpyrrolidone (PVP K30) | 8.25% |
| polyethylene glycol (PEG 400) | (combined) |
| 2-pyrrolidone | 55.3125% |
| N-n-butyl-2-pyrrolidone | 18.4375% |

A membrane performance factor of 255 L/(m²×h×bar) with respect to Cytochrome C could be determined.

The invention claimed is:

1. A method for producing a porous membrane, the method comprising the following steps (a) to (d):
   (a) providing a casting solution, wherein the casting solution comprises polyethersulfone as a membrane-forming polymer dissolved in a solvent system comprising 2-pyrrolidone and N-n-butyl-2-pyrrolidone but not comprising dimethyl sulfoxide, wherein the casting solution further comprises at least one additive selected from the group consisting of polyvinylpyrrolidone, polyvinylpyrrolidone-co-polyvinylacetate, and polyethylene glycol;
   (b) forming a polymer film from the casting solution provided in step (a);
   (c) contacting the polymer film formed in step (b) with a liquid precipitation bath, with a gaseous phase comprising a precipitation-inducing agent or with a combination thereof to induce membrane formation, thereby obtaining a porous membrane; and
   (d) drying the porous membrane obtained in step (c),
   wherein the content ratio of 2-pyrrolidone to N-n-butyl-2-pyrrolidone in the solvent system is in the range of from 80%:20% to 50%:50% based on mass %.

2. The method for producing a porous membrane according to claim 1, wherein the content ratio of 2-pyrrolidone to N-n-butyl-2-pyrrolidone in the solvent system is in the range of from 75%:25% to 50%:50%, based on mass %.

3. The method for producing a porous membrane according to claim 1, wherein the solvent system consists of 2-pyrrolidone and N-n-butyl-2-pyrrolidone.

4. The method for producing a porous membrane according to claim 1, wherein step (c) is performed with a liquid precipitation bath.

5. The method for producing a porous membrane according to claim 4, wherein the liquid precipitation bath is an aqueous solution.

6. A porous membrane, obtainable by the method for producing a porous membrane according to claim 1, the porous membrane having a pore size in the range of from 1 nm to 5 μm and a thickness in the range of from 50 μm to 250 μm, and exhibiting a hybrid bulk structure of two distinct layers arranged on top of one another when viewed in the thickness direction thereof, wherein one of the two distinct layers has a sponge-like morphology without macrovoids.

7. The porous membrane according to claim 6, wherein the distinct layer having a sponge-like morphology without macrovoids has a specific surface area of more than 30 m²/g.

8. The porous membrane according to claim 6, wherein the distinct layer having a sponge-like morphology without macrovoids has a thickness in the range of from 3 μm to 20 μm.

9. The method for producing a porous membrane according to claim 1, wherein the solvent system has a combined content of solvents other than 2-pyrrolidone and N-n-butyl-2-pyrrolidone of not more than 5 mass % with a total mass of the solvent system being 100 mass %.

* * * * *